(12) United States Patent
Yamaji

(10) Patent No.: US 8,419,048 B2
(45) Date of Patent: Apr. 16, 2013

(54) AIRBAG DEVICE

(75) Inventor: Naoki Yamaji, Settsu (JP)

(73) Assignee: Ashimori Industry Co., Ltd., Osaka-shi (JP)

( * ) Notice: Subject to any disclaimer, the term of this patent is extended or adjusted under 35 U.S.C. 154(b) by 0 days.

(21) Appl. No.: 13/394,492

(22) PCT Filed: Oct. 8, 2010

(86) PCT No.: PCT/JP2010/067777
§ 371 (c)(1),
(2), (4) Date: Mar. 6, 2012

(87) PCT Pub. No.: WO2011/052363
PCT Pub. Date: May 5, 2011

(65) Prior Publication Data
US 2012/0161424 A1    Jun. 28, 2012

(30) Foreign Application Priority Data

Oct. 30, 2009    (JP) ................................ 2009-249899

(51) Int. Cl.
*B60R 21/20* (2011.01)
(52) U.S. Cl.
USPC ...................................................... 280/728.3
(58) Field of Classification Search .............. 280/728.2, 280/728.3, 731, 732
See application file for complete search history.

(56) References Cited

U.S. PATENT DOCUMENTS

| | | | | |
|---|---|---|---|---|
| 5,630,614 | A * | 5/1997 | Conlee et al. | 280/730.1 |
| 6,131,944 | A * | 10/2000 | Henkel et al. | 280/728.3 |
| 6,371,510 | B1 * | 4/2002 | Marriott et al. | 280/730.1 |
| 6,616,176 | B2 | 9/2003 | Uchiyama et al. | |
| 6,682,093 | B2 * | 1/2004 | Tajima et al. | 280/732 |
| 7,125,043 | B2 * | 10/2006 | Amamori | 280/743.1 |

(Continued)

FOREIGN PATENT DOCUMENTS

| | | |
|---|---|---|
| JP | 4-143142 | 5/1992 |
| JP | 6-156176 A | 6/1994 |

(Continued)

OTHER PUBLICATIONS

International Search Report Issued Jan. 11, 2011 in PCT/JP10/67777 Filed Oct. 8, 2010.

(Continued)

*Primary Examiner* — Joseph Rocca
*Assistant Examiner* — Robert A Coker
(74) *Attorney, Agent, or Firm* — Oblon, Spivak, McClelland, Maier & Neustadt, L.L.P.

(57) ABSTRACT

An airbag device installed into an instrument panel including a lid portion configured to be torn and a lid-side peripheral wall portion provided to stand on an outer periphery of the lid portion. The airbag device includes: an inflator; an airbag so as to be inflated and deployed in a bag shape by the gas introduced from the inflator; and an outer bag formed of a sheet-like member to be sewn into a three-dimensional shape having an outer-bag-side bottom and an outer-bag-side peripheral wall portion provided on an outer periphery of the outer-bag-side bottom, the outer-bag-side bottom being secured to the inflator, the outer-bag-side peripheral wall portion surrounding the folded airbag and being disposed so as to be sandwiched between the airbag being inflated and deployed and the lid-side peripheral wall portion.

5 Claims, 20 Drawing Sheets

U.S. PATENT DOCUMENTS

| | | | |
|---|---|---|---|
| 7,322,596 B2 * | 1/2008 | Nakazawa et al. | 280/728.2 |
| 7,568,730 B2 * | 8/2009 | Kwon | 280/743.2 |
| 7,597,343 B2 * | 10/2009 | Miwa et al. | 280/728.2 |
| 7,845,683 B2 * | 12/2010 | Sato et al. | 280/743.2 |
| 7,878,534 B2 * | 2/2011 | Kumagai et al. | 280/732 |
| 2002/0175501 A1 * | 11/2002 | Jenkins et al. | 280/728.3 |
| 2002/0185848 A1 * | 12/2002 | Mu et al. | 280/740 |
| 2006/0131843 A1 * | 6/2006 | Sherwood et al. | 280/728.3 |
| 2006/0220355 A1 | 10/2006 | Yokoyama et al. | |
| 2007/0007753 A1 | 1/2007 | Williams et al. | |
| 2007/0241541 A1 * | 10/2007 | Miwa et al. | 280/728.2 |
| 2009/0152842 A1 * | 6/2009 | Benny et al. | 280/728.3 |

FOREIGN PATENT DOCUMENTS

| | | |
|---|---|---|
| JP | 7-215156 | 8/1995 |
| JP | 10-217897 A | 8/1998 |
| JP | 2956895 B2 | 7/1999 |
| JP | 2000 247199 | 9/2000 |
| JP | 2000-326815 A | 11/2000 |
| JP | 2002 220020 | 8/2002 |
| JP | 2003 252160 | 9/2003 |
| JP | 2004-314763 A | 11/2004 |
| JP | 2005 343267 | 12/2005 |
| JP | 2006 76384 | 3/2006 |
| JP | 2006076384 A * | 3/2006 |
| JP | 2006 151015 | 6/2006 |
| JP | 2006 281945 | 10/2006 |
| JP | 4475902 B2 | 3/2010 |
| WO | WO 2009/008221 A1 | 1/2009 |
| WO | 2009 022527 | 2/2009 |

OTHER PUBLICATIONS

International Preliminary Report on Patentability and Written Opinion issued on Jun. 21, 2012 in PCT/JP2010/067777 filed on Oct. 8, 2010 (with English Translation).

Extended European Search Report issued on Feb. 11, 2013 in corresponding European application No. 10826497.9.

\* cited by examiner

FIG. 2
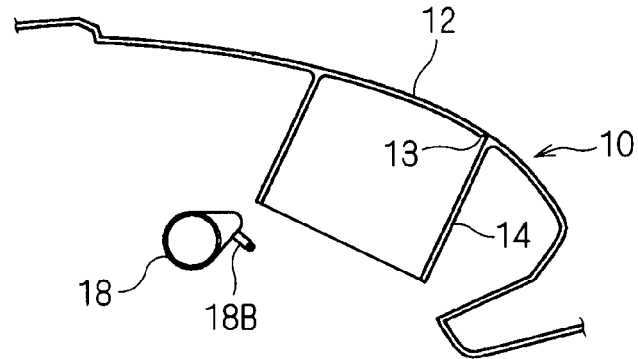
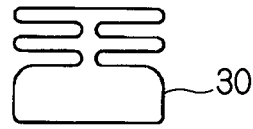
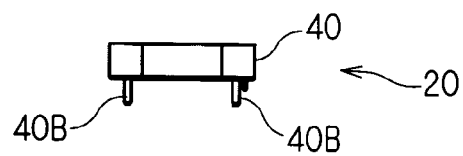
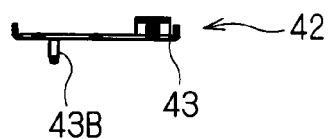
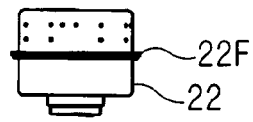
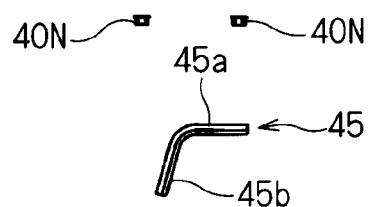

FIG. 17
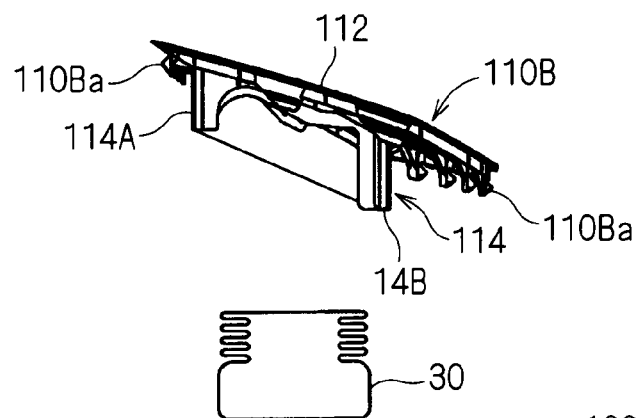
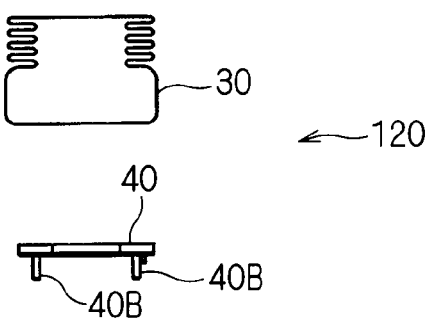
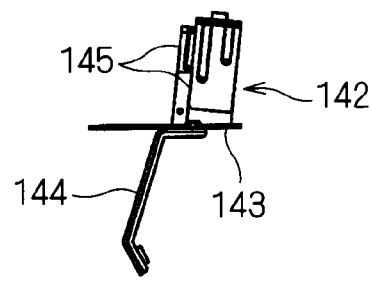
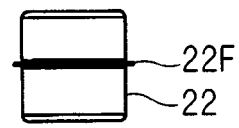

F I G . 1 8
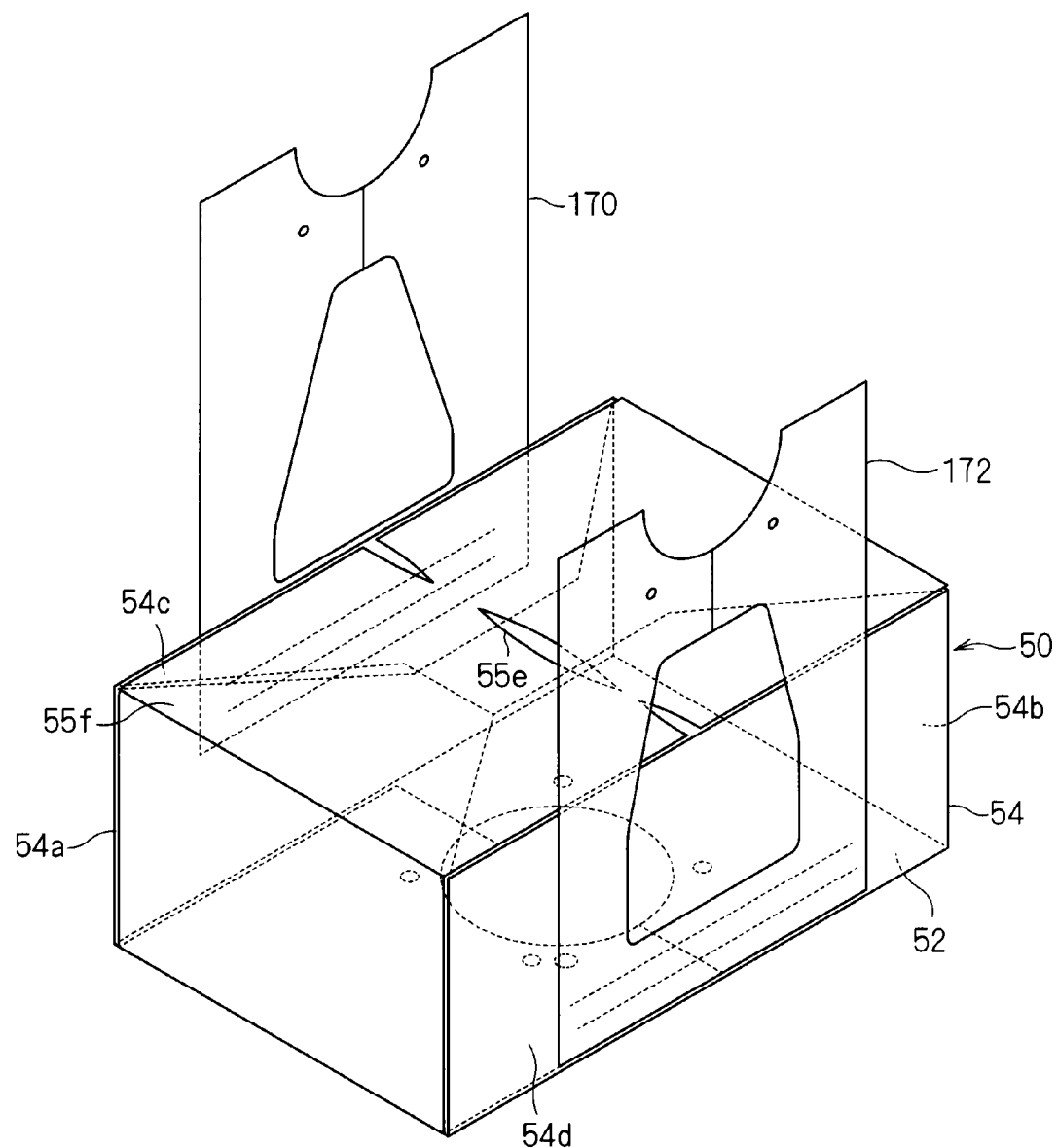

F I G. 2 3
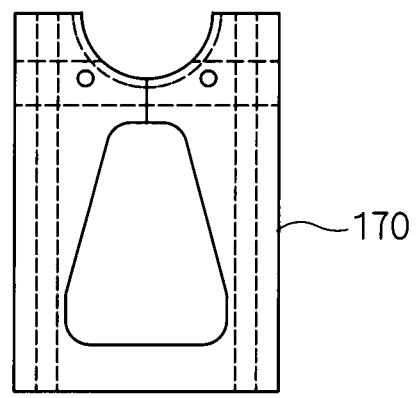

AIRBAG DEVICE

TECHNICAL FIELD

The present invention relates to an airbag device that is inflated and deployed to protect an occupant in the event of, for example, a vehicle collision.

BACKGROUND ART

An airbag device for a passenger seat is disposed in an instrument panel in a normal state. In the event of a vehicle collision or the like, an airbag is inflated and deployed by tearing a lid provided in the instrument panel, to thereby protect an occupant.

In the above-mentioned airbag device, an airbag is surrounded by a plate formed of a resin, metal or the like such that the airbag is inflated and deployed in the direction of tearing the lid in the instrument panel. Accordingly, airbag devices tend to be larger in weight.

Therefore, Patent Document 1 discloses an airbag module in which a chute assembly that secures an inflator device is formed of a fabric or the like, the chute assembly is secured to a square-frame-shaped collar formed of metal or the like, and the collar is attached to a vehicle.

PRIOR ART DOCUMENTS

Patent Document

Patent Document 1: Japanese Patent Application No. 2008-544920

SUMMARY OF THE INVENTION

Problem to be Solved by the Invention

Unfortunately, in the airbag module disclosed in Patent Document 1, the chute assembly is attached to a vehicle through a square-frame-shaped color formed of metal or the like, and thus a weight reduction effect is insufficient.

Therefore, an object of the present invention is to reduce a weight of a configuration for suppressing an airbag from extending in a radial direction as much as possible.

Means to Solve the Problem

In order to solve the above-mentioned problem, a first aspect relates to an airbag device installed into an airbag-installation panel including a lid portion configured to be torn and a lid-side peripheral wall portion provided to stand on an outer periphery of the lid portion, which includes: an inflator disposed inside the lid portion and configured to generate gas; an airbag folded so as to be disposed between the lid portion and the inflator and configured to be inflated and deployed in a bag shape by the gas introduced from the inflator; and an outer bag formed of a sheet-like member to be sewn into a three-dimensional shape including an outer-bag-side bottom and an outer-bag-side peripheral wall portion provided on an outer periphery of the outer-bag-side bottom, the outer-bag-side bottom being secured to the inflator, the outer-bag-side peripheral wall portion surrounding the folded airbag and being disposed so as to be sandwiched between the airbag being inflated and deployed and the lid-side peripheral wall portion.

According to a second aspect, in the airbag device of the first aspect, an extending portion is disposed at a distal end of the outer-bag-side peripheral wall portion, the extending portion being configured to be sandwiched between the airbag being inflated and deployed and an exterior surface of the airbag-installation panel located on the outer periphery side of the lid portion.

According to a third aspect, the airbag device of the first or second aspect further includes an inflator securing member including a reaction plate to which the inflator is secured and a securing bracket configured to be secured to a vehicle-body-side member, wherein the inflator is secured to a fixed location inside of the lid portion upon securing of the securing bracket to the vehicle-body-side member.

According to a fourth aspect, the airbag device of any one of the first to third aspects further includes a belt portion connected to the inflator and the lid-side peripheral wall portion and holding the inflator at a fixed location inside of the lid portion.

According to a fifth aspect, in the airbag device of the fourth aspect, one end of the belt portion is connected to the inflator, and the other end of the belt portion is caused to pass through a mounting hole formed in the lid-side peripheral wall portion to be connected to the outer-bag-side peripheral wall portion.

According to a sixth aspect, in the airbag device of the fourth aspect, a middle portion of the belt portion in a longitudinal direction is caused to pass through a mounting hole formed in the lid-side peripheral wall portion, and both ends of the belt portion are connected to the inflator.

According to a seventh aspect, in the airbag device of the fourth aspect, one end of the belt portion is connected to the inflator, and the other end of the belt portion is interlocked with and secured to the lid-side peripheral wall portion through a hook portion.

Effects of the Invention

According to the airbag device of the first aspect, when the airbag is inflated and deployed, the outer-bag-side peripheral wall portion is sandwiched between the airbag that tries to be inflated and deployed and the lid-side peripheral wall portion. Accordingly, the state in which the outer-bag-side peripheral wall portion surrounds the airbag between the lid-side peripheral wall portion and the inflator is kept. This suppresses the airbag from spreading in a radial direction between the lid-side peripheral wall portion and the inflator. Further, the configuration for suppressing the airbag from spreading in the radial direction can be achieved by the outer bag formed mainly of a sheet-like member that is sewn into a three-dimensional shape, which reduces a weight as much as possible.

According to the second aspect, when the airbag is inflated and deployed, the extending portion provided at the distal end of the outer-bag-side peripheral wall portion is sandwiched between the airbag being inflated and deployed and a peripheral portion outside an opening of the airbag-installation panel after the lid portion is torn, which makes it difficult for the outer-bag-side peripheral wall portion to come off the part between the airbag being inflated and deployed and the lid-side peripheral wall portion. This suppresses the airbag from spreading in a radial direction between the lid-side peripheral wall portion and the inflator more reliably.

According to the third aspect, the inflator can be secured at a fixed location inside of the lid portion by a securing bracket, which simplifies or omits the configuration of securing the inflator and the airbag-installation panel to each other.

According to the fourth aspect, the inflator is held at a fixed location inside of the lid portion by the belt portion, which reduces a weight of the configuration of securing the inflator.

According to the fifth aspect, the other end of the belt portion passes through the mounting hole formed in the lid-side peripheral wall portion and then is connected to the outer-bag-side peripheral wall portion, which makes it difficult for the outer-bag-side peripheral wall portion to come off the part between the airbag being inflated and deployed and the lid-side peripheral wall portion. This suppresses the airbag from spreading in the radial direction between the lid-side peripheral wall portion and the inflator more reliably.

According to the sixth aspect, it is only required to connect the both ends of the belt portion to the inflator, which simplifies the connection structure thereof.

According to the seventh aspect, the other end of the belt portion can be easily interlocked with and secured to the lid-side peripheral wall portion through the hook portion.

BRIEF DESCRIPTION OF DRAWINGS

FIG. 2 is an exploded cross-sectional view showing the airbag device.

FIG. 17 is an exploded cross-sectional view showing the airbag device.

FIG. 18 is a perspective view showing an outer bag.

FIG. 23 is an explanatory view showing the outer bag manufacturing process.

EMBODIMENTS FOR CARRYING OUT THE INVENTION

First Embodiment

Figure 1:
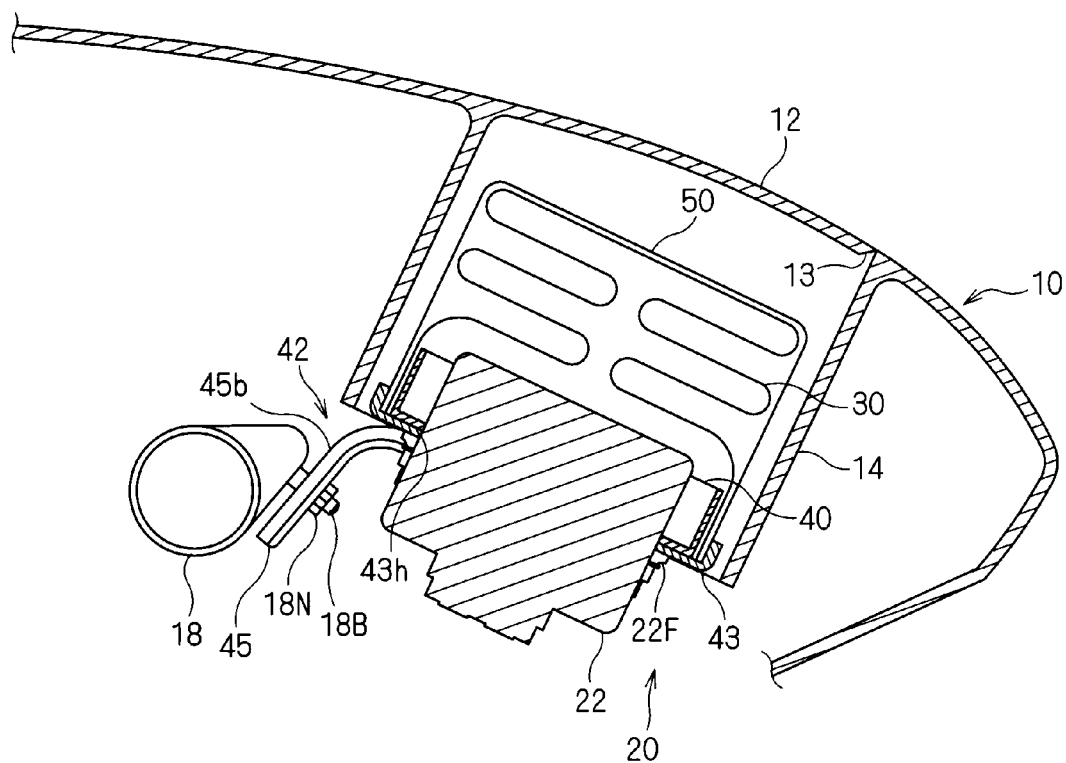
FIG. 1 is a cross-sectional view showing an airbag device according to a first embodiment.

Hereinafter, an airbag device according to a first embodiment is described. FIG. 1 is a cross-sectional view showing an entire configuration of an airbag device 20 according to the present embodiment, and FIG. 2 is an exploded cross-sectional view showing the airbag device 20. FIG. 1 and FIG. 2 each show a cross section in a surface along a front and rear direction of a vehicle.

The airbag device 20 is installed into an instrument panel 10 located in front of a passenger seat of a vehicle, which is configured as a device that is inflated and deployed toward the front of a passenger-seat occupant in the event of, for example, a vehicle collision, to thereby brace the passenger-seat occupant and absorb an impact.

That is, the instrument panel 10 is disposed as an airbag-installation panel in the front of the passenger seat of the vehicle. Formed in the instrument panel 10 is a lid portion 12 that can be torn. Here, the instrument panel 10 is formed of a resin. A groove-like tear line 13 is formed on the inner peripheral surface of the instrument panel 10 so as to surround an approximately square-shaped region thereof from three sides, and accordingly the area surrounded by the tear line 13 corresponds to the lid portion 12. The airbag device 20 is installed inside the lid portion 12. When the airbag device 20 is activated, the instrument panel 10 is torn along the tear line 13, and the lid portion 12 is torn, to thereby form an opening. A lid-side peripheral wall portion 14 that is provided to stand on an outer periphery of the lid portion 12 is formed on the inner surface of the instrument panel 10. The lid-side peripheral wall portion 14 is positioned on the side closer to the outer periphery than the tear line 13 and surrounds the lid portion 12 over the entire outer periphery thereof. Note that the location at which the tear line 13 is formed is not limited to the above-mentioned example, and is merely required to be formed at the location at which the opening for airbag deployment can be formed when the airbag device 20 operates.

A vehicle-body-side member 18 being a member secured to a vehicle body is disposed inside the instrument panel 10. Here, a member (member referred to as reinforcement) that is secured to the body and is disposed along the vehicle width direction inside of the instrument panel 10 is assumed as the vehicle-body-side member 18. The instrument panel 10 is secured to a vehicle body by a mounting structure such as a well-known structure, and the vehicle-body-side member 18 is secured to the vehicle body as well, whereby the instrument panel 10 and the vehicle-body-side-member 18 are maintained in the fixed positional relationship.

The airbag device 20 is installed into the instrument panel 10 as described above. Note that the installation of the airbag device 20 into the instrument panel 10 includes a case where the airbag device 20 is disposed at the location at which the airbag device 20 can be inflated and deployed from the instrument panel 10, and the airbag device 20 is not necessarily required to be secured to the instrument panel 10 physically and mechanically.

The airbag device 20 includes an inflator 22, an airbag 30 and an outer bag 50.

The inflator 22 includes an ignition device, a gas generator and the like and is disposed inside the lid portion 12. The inflator 22 is configured to ignite and burn the gas generator by the ignition device in response to, for example, an ignition order signal from an impact detecting part or the like placed in the vehicle itself, to thereby generate gas.

The airbag 30 is formed of a fabric or the like into a bag shape that has a gas inlet. The inflator 22 is mounted to the airbag 30 at the location and in the position where gas can be introduced into the airbag 30 through the gas inlet. In a normal state, the airbag 30 is folded to be disposed between the lid portion 12 and the inflator 22. The airbag 30 is configured to, when being inflated and deployed in the event of, for example, a vehicle collision, be inflated so as to project outside the instrument panel 10 by tearing the lid portion 12, and then be inflated and deployed in a bag shape toward the passenger-seat occupant side being the room interior side, by the gas introduced from the inflator 22 through the gas inlet.

Figure 3:
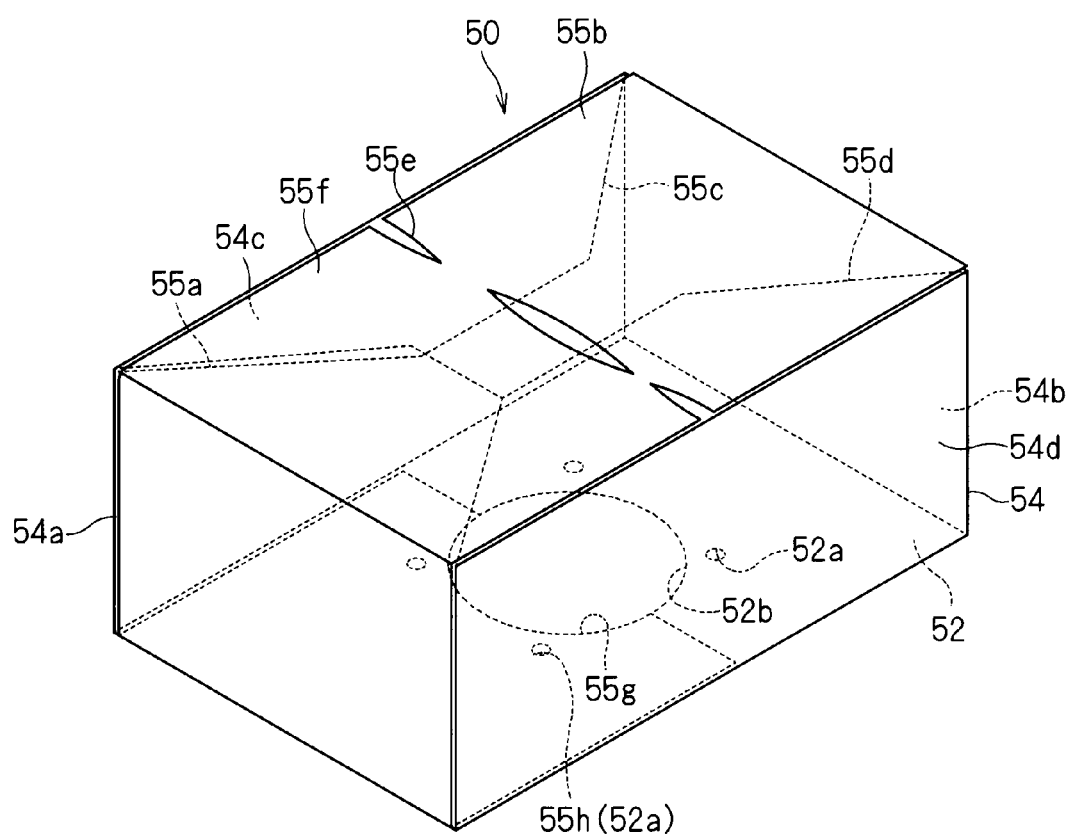
FIG. 3 is a perspective view showing an outer bag.

FIG. 3 is a perspective view showing the outer bag 50. As shown in FIG. 1 to FIG. 3, the outer bag 50 is configured by sewing a flexible sheet-like member that can be folded as well as sewn, such as a fabric or a resin sheet, in a three-dimensional shape, and includes an outer-bag-side bottom 52 and an outer-bag-side peripheral wall portion 54.

The outer-bag-side bottom 52 is the part secured to the inflator 22. In this case, the outer-bag-side bottom 52 is formed into an approximately square shape, and an opening 52h having a shape and size corresponding to an inlet of the airbag 30 is formed approximately in the center portion thereof. Further, a plurality of outer bag securing holes 52a are formed on the outer periphery of the opening 52h in the outer-bag-side bottom 52. The outer-bag-side bottom 52 is secured to the inflator 22 by means of the outer bag securing holes 52a as described below. Securing holes are formed at locations corresponding to the plurality of outer bag securing holes 52a in the airbag 30 and an annular projection 22F provided around the inflator 22.

The outer-bag-side peripheral wall portion 54 is provided on the outer periphery of the outer-bag-side bottom 52, which is provided so as to surround a principal surface side of the outer-bag-side bottom 52 in an approximately square annular shape. More specifically, the outer-bag-side peripheral wall portion 54 includes first side wall portions 54a and 54b that are extended from a pair of opposing short sides of the outer-bag-side bottom 52, and second side wall portions 54c and 54d that are extended from a pair of opposing long sides of the outer-bag-side bottom 52. The side edges of the first side wall portions 54a and 54b are sewn to the side edges of the second side wall portions 54c and 54d between adjacent ones, thereby forming the outer-bag-side peripheral wall portion 54 having an approximately square tube shape. That is, it can be considered that the outer bag 50 has an approximately housing shape with one side being open by the outer-bag-side bottom 52 and the outer-bag-side peripheral wall portion 54. Needless to say, the shape of the outer bag 50 may be a shape obtained by closing one end of an elliptical tube shape, a tube shape or a polygonal tube shape correspondingly to the shape of the inner peripheral surface of the lid-side peripheral wall portion 14.

Figure 12:
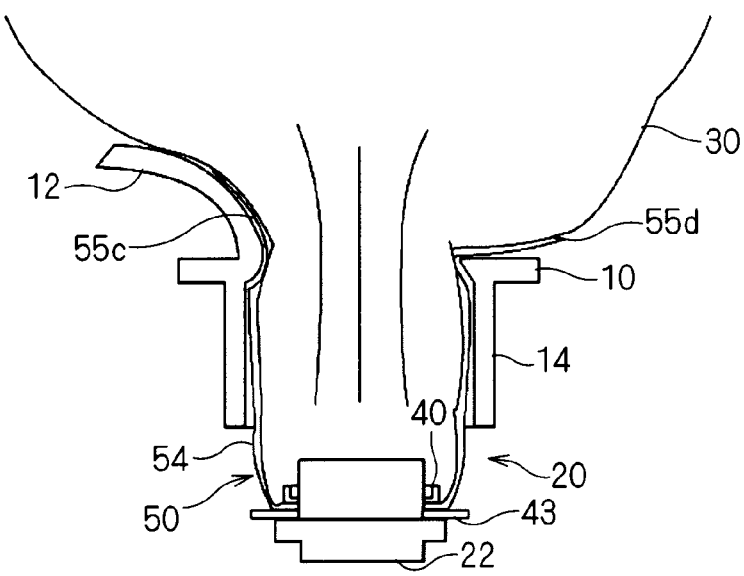
FIG. 12 is an explanatory view showing the operation of deploying the airbag device.

A projecting dimension of the outer-bag-side peripheral wall portion 54 from the outer-bag-side bottom 52 is set to a dimension to such an extent that at least part of the outer-bag-side peripheral wall portion 54 is sandwiched between the airbag 30 being inflated and deployed and the lid-side peripheral wall portion 14 when the airbag 30 is inflated and deployed (in other words, to such an extent that it is disposed to be superimposed on the inner side of the lid-side peripheral wall portion 14 when being inflated and deployed) (see FIG. 12). For example, when the dimension between the outer periphery of the inflator 22 and the outer periphery at the distal end of the lid-side peripheral wall portion 14 when the airbag 30 is inflated and deployed is represented as M, it is preferable that a projecting dimension L of the outer-bag-side peripheral wall portion 54 from the outer-bag-side bottom 52 be a dimension obtained by adding an additional dimension a to the dimension M. The additional dimension a is a dimension enough to keep the state in which at least part of the outer-bag-side peripheral wall portion 54 is sandwiched between the airbag 30 being inflated and deployed and the lid-side peripheral wall portion 14 in consideration of, for example, outward swelling of the outer-bag-side bottom 52 due to the airbag 30 being inflated and deployed. Such an additional dimension a can be set experimentally and empirically by taking the performance or the like of the airbag 30 or inflator 22 into consideration. In this case, the projecting dimension of the outer-bag-side peripheral wall portion 54 from the outer-bag-side bottom 52 is set to be approximately identical to the thickness dimension of the folded airbag 30. The outer-bag-side peripheral wall portion 54 surrounds four sides of the folded airbag 30 in a normal state.

First extending portions 55a and 55b are provided at the distal ends of the first side wall portions 54a and 54b, respectively, and second extending portions 55c and 55d are provided at the distal ends of the second side wall portions 54c and 54d, respectively. The first extending portion 55a and the second extending portions 55c and 55d are formed in an approximately trapezoidal shape in which those become gradually narrower toward the distal ends, and are configured to cover the upper portion of the folded airbag 30 in such a manner that those hardly overlap each other. The first extending portion 55b is formed into an approximately square shape, and an extending portion for enclosure 55f is extended at the distal end thereof. The first extending portion 55b and the extending portion for enclosure 55f are connected to each other through a weakened part 55e that can be torn upon the airbag 30 being inflated and deployed. Here, the weakened part 55e is formed by partially cutting the part between the first extending portion 55b and the extending portion for enclosure 55f in a linear manner. An arc-shaped recess 55g is formed at the distal end of the extending portion for enclosure 55f correspondingly to the outer peripheral shape of the inflator 22, and securing holes 55h are formed at locations that are located on the outer periphery of the arc-shaped recess 55g and correspond to parts of the outer bag securing holes 52a. The first extending portion 55b and the extending portion for enclosure 55f cover the upper portion of the folded airbag 30 from outer sides of the first extending portion 55a and the second extending portions 55c and 55d. In this state, the weakened part 55e is set so as to be located at an approximately center of the upper portion of the folded airbag 30. The extending portion for enclosure 55f wraps around the bottom side (inflator 22 side) after passing through the side of the folded airbag 30 from the upper portion thereof, and is secured to the inflator 22.

The first extending portions 55a and 55b and the second extending portions 55c and 55d are configured so as to be sandwiched between the airbag 30 being inflated and deployed and the outer peripheral surface of the lid portion 12 of the instrument panel 10 when the airbag 30 is inflated and deployed (see FIG. 12). That is, the first extending portions 55a and 55b and the second extending portions 55c and 55d are set to dimensions to such an extent that those extend beyond the lid-side peripheral wall portion 14, pass through the openings formed in the instrument panel 10, and extend outwardly.

In the present embodiment, the outer bag 50 is secured to the inflator 22 but is not secured to the instrument panel 10 and the lid portion 12.

Description is given of an example of the method of manufacturing the outer bag 50.

Figure 4:
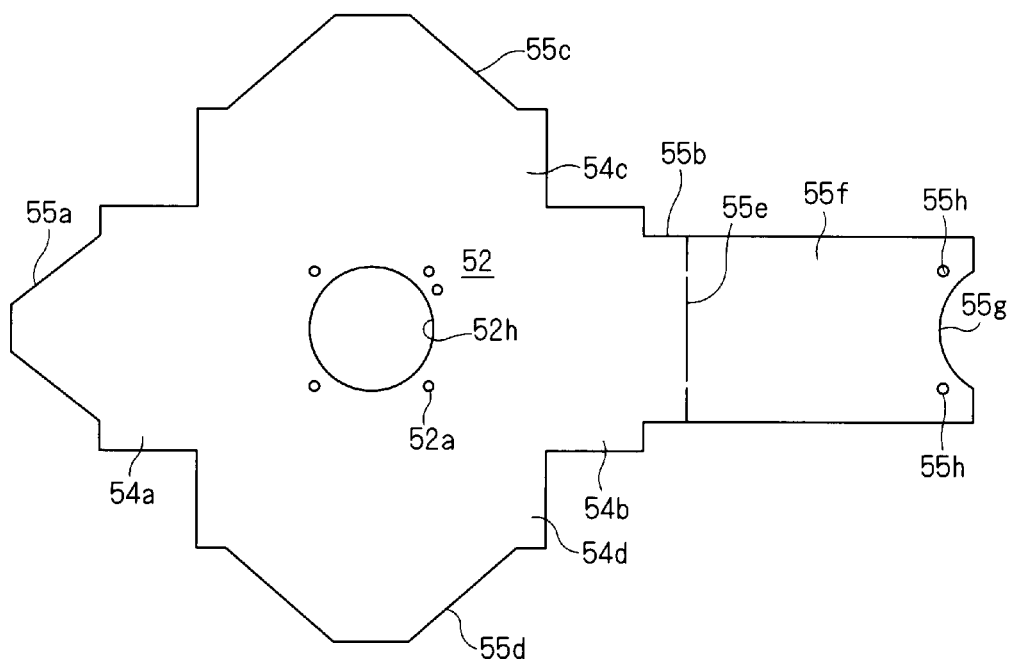
FIG. 4 is an explanatory view showing an outer bag manufacturing process.

First, as shown in FIG. 4, a sheet-like member formed of a fabric or the like is appropriately cut, to thereby form a sheet-like member having an approximately cross shape in which the first side wall portions 54a and 54b and the second side wall portions 54c and 54d extend from four sides of the outer-bag-side bottom 52 having an approximately square shape. The first extending portion 55a and the second extending portions 55c and 55d are extended at the distal ends of the first side wall portion 54a and the second side wall portions 54c and 54d, respectively, and the first extending portion 55b and the extending portion for enclosure 55f are extended at the distal end of the first side wall portion 54b.

Figure 5:
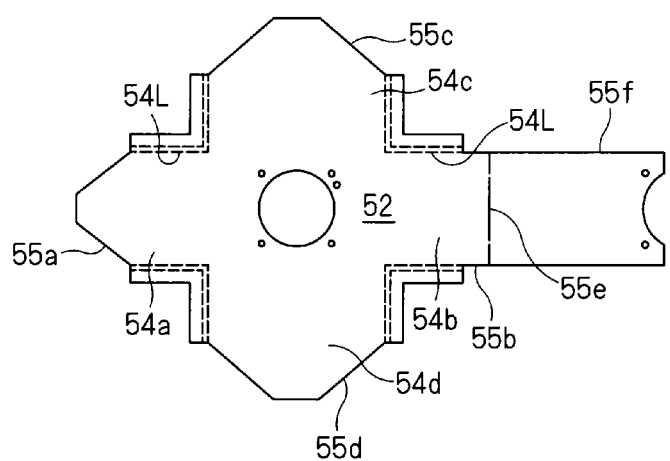
FIG. 5 is an explanatory view showing the outer bag manufacturing process.
Figure 6:
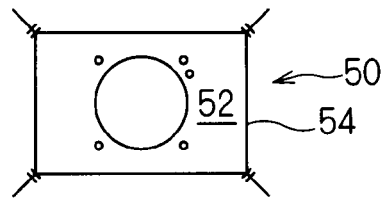
FIG. 6 is an explanatory view showing the outer bag manufacturing process.
Figure 7:
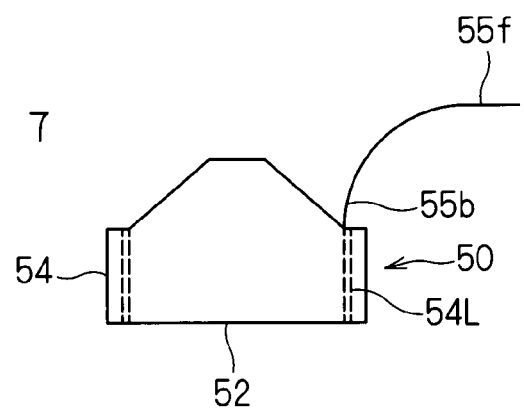
FIG. 7 is an explanatory view showing the outer bag manufacturing process.
Figure 8:
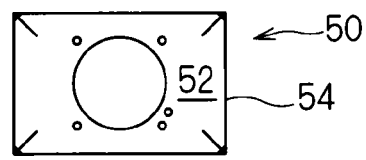
FIG. 8 is an explanatory view showing the outer bag manufacturing process.
Figure 9:
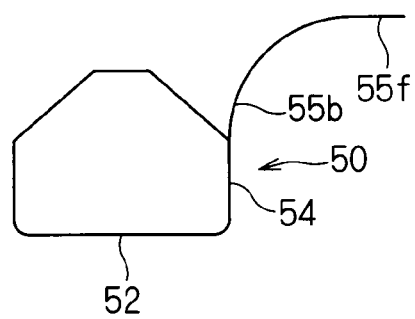
FIG. 9 is an explanatory view showing the outer bag manufacturing process.

Then, the side edges of the first side wall portions 54a and 54b and the second side wall portions 54c and 54d are sewn together along seams 54L shown in FIG. 5. Accordingly, as shown in FIG. 6 and FIG. 7, the outer bag 50 is three-dimensionally sewn into an approximately housing shape in which one side (upper side) is open. Next, as shown in FIG. 8 and FIG. 9, the outer bag 50 immediately after sewing is turned inside out, to thereby obtain the outer bag 50 that has an approximately housing shape in which one side (upper side) is open and seams are located inside. Then, the folded airbag 30 is housed and arranged in this outer bag 50, and in that housed state, the first extending portions 55a and 55b, the second extending portions 55c and 55d and the extending portion for enclosure 55f are tucked in an outer peripheral shape of the folded airbag 30.

It suffices that in the above-mentioned outer bag 50, for example, a superimposed structure of a plurality of sheets is appropriately employed entirely or partially in accordance with the necessity in strength or the like.

The mounting structure of the inflator 22, the airbag 30 and the outer bag 50 is described.

As shown in FIG. 1 and FIG. 2, the configuration for mounting the inflator 22, the airbag 30 and the outer bag 50 includes an inner ring member 40 and an inflator securing member 42.

The inner ring member 40 is formed of a metal plate or the like, which is formed as a ring-shaped member having approximately the same hole as the inlet formed in the airbag 30. The inner ring member 40 is a member also referred to as a cushion ring. In the inner ring member 40, a plurality of securing bolts 40B are provided as securing members in a projecting manner at the locations respectively corresponding to the plurality of outer bag securing holes 52a described above (or securing holes of the airbag 30).

The inflator securing member 42 includes a reaction plate 43 and a securing bracket 45.

The reaction plate 43 is formed of a metal plate or the like, which is formed into a plate shape capable of closing the inner opening of the lid-side peripheral wall portion 14 at least partially, in this case, a plate shape smaller than the inner opening of the lid-side peripheral wall portion 14. A mounting hole 43h having approximately the same size and shape as those of the inlet formed in the airbag 30 is formed in the reaction plate 43. Further, around an outer periphery of the mounting hole 43h of the reaction plate 43, a plurality of mounting holes are formed at the respective locations corresponding to the above-mentioned plurality of outer bag securing holes 52a (or securing holes of the airbag 30).

Then, the inner ring member 40 is disposed on the periphery of the inlet in the airbag 30, and the airbag 30 is folded. After that, the securing bolts 40B are caused to pass through the mounting holes formed in the airbag 30, the outer bag 50, the reaction plate 43 and the inflator 22 in this order, whereby securing nuts 40N are screwed and fastened with the securing bolts 40B. As a result, the airbag 30, the outer bag 50 and the reaction plate 43 are mounted and secured in the state of being sandwiched between the inner ring member 40 and the annular projection 22F of the inflator 22.

Needless to say, the securing structure of the respective configurations is not limited to the example above. For example, an outer bag may be secured to a reaction plate or the like and may be secured indirectly to the inflator 22 through the reaction plate or the like. Alternatively, a reaction plate may be not provided.

The securing bracket 45 is a member formed of a metal plate or the like, and includes a plate-side securing part 45a secured to the reaction plate 43 and a vehicle-body-side securing part 45b secured to the vehicle-body-side member 18. The plate-side securing part 45a is disposed along a back surface of the reaction plate 43, and is secured to the reaction plate 43 by causing the securing bolts 43B provided in the reaction plate 43 in a projecting manner to pass through the part 45a and, for example, screwing and fastening the nuts 43N with the securing bolts 43B (see FIG. 2). Meanwhile, the vehicle-body-side securing part 45b extends from the plate-side securing part 45a to the vehicle-body-side member 18 and is secured to the vehicle-body-side member 18. In this case, a vehicle-body-side securing bolt 18B provided in a projecting manner in the vehicle-body-side member 18 is caused to pass through the vehicle-body-side securing part 45b, and a nut 18N is screwed and fastened with the vehicle-body-side securing bolt 18B, whereby the vehicle-body-side securing part 45b is secured to the vehicle-body-side member 18 (see FIG. 1).

Then, the securing bracket 45 is secured to the vehicle-body-side member 18, so that the inflator 22 is secured to a fixed location (that is, a location spaced for disposing the folded airbag 30 between the lid portion 12 and the inflator 22) inside of the lid portion 12 through the reaction plate 43.

Note that fixation of a fixing bracket to a reaction plate or a vehicle-body-side member is not limited to the example above, which may be, for example, caulking or welding, fitting structure, or a composite configuration of those. Further, the securing bracket may be configured to be secured indirectly to the inflator through the reaction plate or the like as described above, or may be configured to be secured directly to the inflator. Further, the securing bracket may be secured to any part on the vehicle-body-side as long as it is not a mounting panel that entirely covers the airbag device 20 in a normal state.

Figure 10:
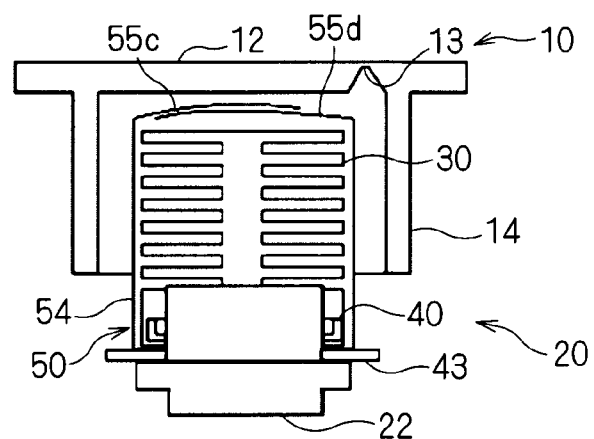
FIG. 10 is an explanatory view showing an operation of deploying the airbag device.
Figure 11:
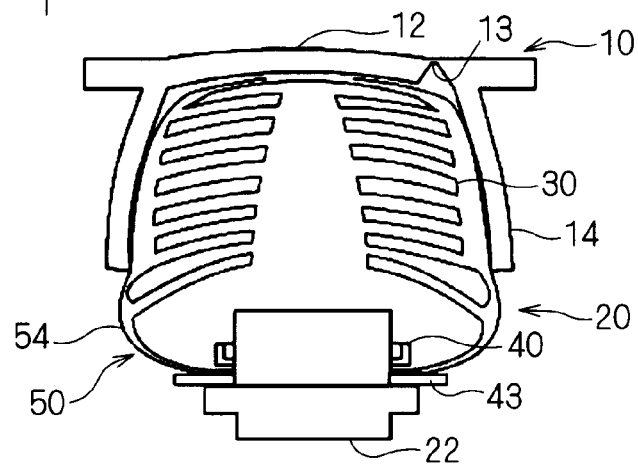
FIG. 11 is an explanatory view showing the operation of deploying the airbag device.

FIG. 10 to FIG. 12 are explanatory views showing the operation of deploying the airbag device 20. Note that the explanatory views showing the deployment operation are simplified for the sake of description.

First, in a normal state before the deploying operation, as shown in FIG. 10, the folded airbag 30 is disposed between the lid portion 12 and the inflator 22. In this state, the lid-side peripheral wall portion 14 surrounds the folded airbag 30 from four sides thereof. The first side wall portions 54a and 54b and the second side wall portions 54c and 54d of the outer bag 50 surround the folded airbag 30 from four sides thereof, and the first extending portions 55a and 55b and the second extending portions 55c and 55d cover the upper portion of the folded airbag 30.

When the gas from the inflator 22 is introduced into the airbag 30 in this state, as shown in FIG. 11, the airbag 30 starts to be inflated in the space surrounded by the lid portion 12, the lid-side peripheral wall portion 14 and the inflator 22.

On this occasion, in the direction in which the airbag 30 mainly projects (direction from the inflator 22 toward the lid portion 12), the inflator 22 is secured at the location spaced from the lid portion 12 by a certain distance by the inflator securing member 42, whereby the force for inflating and deploying the airbag 30 in the projecting direction acts as the force for splitting the tear line 13 of the lid portion 12. Accordingly, the lid portion 12 is torn, to thereby form an opening in the instrument panel 10.

On this occasion, the airbag 30 tries to be inflated and deployed also in a radial direction toward the surrounding of the mainly projecting direction (direction from the inflator 22 toward the lid portion 12) being the center. In this case, in the part in which the lid-side peripheral wall portion 14 is located, the airbag 30 that tries to be inflated and deployed is pressed against the inner surface of the lid-side peripheral wall portion 14, whereby the outer-bag-side peripheral wall portion 54 is held so as to be sandwiched between the airbag 30 and the lid-side peripheral wall portion 14. As a result, the part of the outer-bag-side peripheral wall portion 54, which is interposed between the lid-side peripheral wall portion 14 and the inflator 22, braces the portion of the airbag 30 that tries to be inflated and deployed in the vicinity of the inflator 22 over the entire periphery. This suppresses the airbag 30 from being inflated and deployed outwardly so as to spread between the lid-side peripheral wall portion 14 and the inflator 22 in the radial direction.

Then, when the lid portion 12 is torn, as shown in FIG. 12, the airbag 30 is inflated and deployed outwardly after passing through the opening of the instrument panel 10. Further, the weakened part 55e of the outer bag 50 is also split by the force for inflating and deploying the airbag 30 before/after the rid portion 12 is torn by the airbag 30. Then, when the airbag 30 is inflated and deployed outwardly after passing through the opening of the instrument panel 10, the first extending portions 55a and 55b and the second extending portions 55c and 55d are pushed outwardly after passing through the opening of the instrument panel 10, and are held so as to be sandwiched between the periphery of the opening or the torn lid portion 12 of the instrument panel 10 and the airbag 30 being inflated and deployed. Accordingly, in the state in which the airbag 30 is inflated and deployed outside the instrument panel 10, the state in which the outer-bag-side peripheral wall portion 54 partially overlaps the lid-side peripheral wall portion 14 is maintained by at least one of the configuration in which the outer-bag-side peripheral wall portion 54 is sandwiched between the airbag 30 and the lid-side peripheral wall portion 14 and the configuration in which the first extending portions 55a and 55b and the second extending portions 55c and 55d are sandwiched between the periphery of the opening of the instrument panel 10 and the airbag 30 being inflated and deployed. Accordingly, similarly to the above, the part of the outer-bag-side peripheral wall portion 54, which is interposed between the lid-side peripheral wall portion 14 and the inflator 22, braces the part of the airbag 30 being inflated and deployed in the vicinity of the inflator 22 over the entire periphery, which suppresses the airbag 30 from spreading in the radial direction between the lid-side peripheral wall portion 14 and the inflator 22.

Then, the airbag 30 is inflated and deployed between the instrument panel 10 and the passenger-seat occupant to brace the passenger-seat occupant and absorb an impact.

According to the airbag device 20 configured as described above, when the airbag 30 is inflated and deployed, the outer-bag-side peripheral wall portion 54 is sandwiched between the airbag 30 that tries to be inflated and the lid-side peripheral wall portion 14. This sandwiching and holding force keeps the state in which the outer-bag-side peripheral wall portion 54 surrounds the airbag 30 between the lid-side peripheral wall portion 14 and the inflator 22. This suppresses the airbag 30 from spreading in the radial direction between the lid-side peripheral wall portion 14 and the inflator 22. At the stage in which the necessity of suppressing the airbag 30 from spreading in the radial direction within the instrument panel 10 decreases, such as after the airbag 30 is sufficiently inflated and deployed outside the instrument panel 10, the outer-bag-side peripheral wall portion 54 may come off the inner surface side of the lid-side peripheral wall portion 14.

Moreover, the side edges of the first side wall portions 54a and 54b and the second side wall portions 54c and 54d are sewn together to form the outer-bag-side peripheral wall portion 54 into an approximately square tube shape, with the result that the force for inflating and deploying the airbag 30 in the radial direction is also experienced by the structure of surrounding the airbag 30 by the outer-bag-side peripheral wall portion 54. For this reason, the force for causing the outer-bag-side peripheral wall portion 54 to come off the part between the airbag 30 and the lid-side peripheral wall portion 14 is hard to act. Also from this point, the state in which the outer-bag-side peripheral wall portion 54 surrounds the airbag 30 between the lid-side peripheral wall portion 14 and the inflator 22 is maintained, which suppresses the airbag 30 from spreading in the radial direction between the lid-side peripheral wall portion 14 and the inflator 22 more reliably.

Further, the configuration for suppressing the airbag 30 from spreading in the radial direction as described above can be achieved mainly by the outer bag 50 that is sewn more three-dimensionally than a sheet-like member. Accordingly, it is not required to, for example, provide a standing wall or the like for suppressing the airbag 30 from being inflated in the radial direction in the reaction plate 43, and the standing wall can be omitted or made smaller. This reduces the weight of the airbag device 20 as much as possible.

Further, when the airbag 30 is inflated and deployed, the first extending portions 55a and 55b and the second extending portions 55c and 55d provided at the distal ends of the outer-bag-side peripheral wall portion 54 are sandwiched between the airbag 30 being inflated and deployed and the outer periphery of the opening of the instrument panel 10. Accordingly, even after the airbag 30 is inflated and deployed outwardly, the outer-bag-side peripheral wall portion 54 becomes difficult to come off the part between the airbag 30 and the lid-side wall peripheral wall portion 14. This suppresses the airbag 30 from spreading in the radial direction between the lid-side peripheral wall portion 14 and the inflator 22 more reliably.

Figure 13:
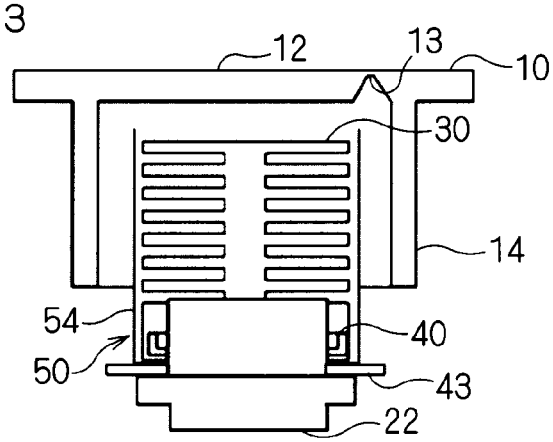
FIG. 13 is an explanatory view showing an operation of deploying an airbag device according to a modification of the first embodiment.
Figure 14:
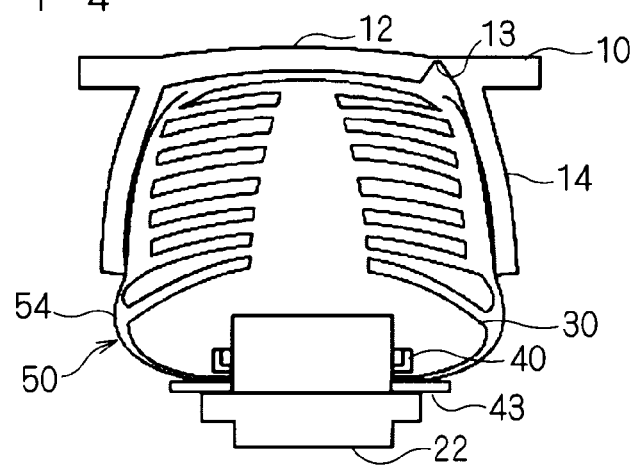
FIG. 14 is an explanatory view showing the operation of deploying the airbag device according to the modification of the first embodiment.
Figure 15:
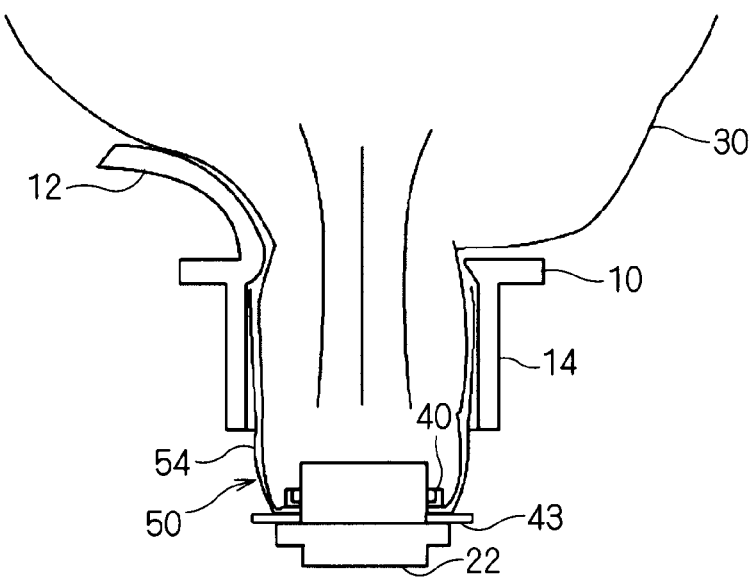
FIG. 15 is an explanatory view showing the operation of deploying the airbag device according to the modification of the first embodiment.

Needless to say, the first extending portions 55a and 55b and the second extending portions 55c and 55d are not necessarily required. Also in this case, as shown in FIG. 13 to FIG. 15, the outer-bag-side peripheral wall portion 54 is sandwiched between the airbag 30 being inflated and deployed and the lid-side peripheral wall portion 14, and accordingly the state in which the outer-bag-side peripheral wall portion 54 surrounds the airbag 30 between the lid-side peripheral wall portion 14 and the inflator 22 is maintained by this sandwiching and holding force, which suppresses the airbag 30 from spreading in the radial direction between the lid-side peripheral wall portion 14 and the inflator 22.

Further, the inflator 22 is secured to a fixed location inside of the lid portion 12 by means of the securing bracket 45, and thus the structure of securing the inflator 22 and the instrument panel 10 can be simplified or omitted. For example, it suffices that the inflator 22, the airbag 30, the outer bag 50 and the like are secured to the vehicle-body-side by means of the securing bracket 45 and the instrument panel 10 is installed such that the airbag 30 part is disposed in the space surrounded by the lid portion 12 and the lid-side peripheral wall portion 14, which makes the operation of assembling the airbag device 20 and the instrument panel 10 easier.

Needless to say, an inflator or reaction plate may be secured to an instrument panel. Also in this case, the securing structure therefor does not need to be robust enough to withstand the force when an airbag is inflated and deployed, which may be a simplified securing structure.

Second Embodiment

Figure 16:
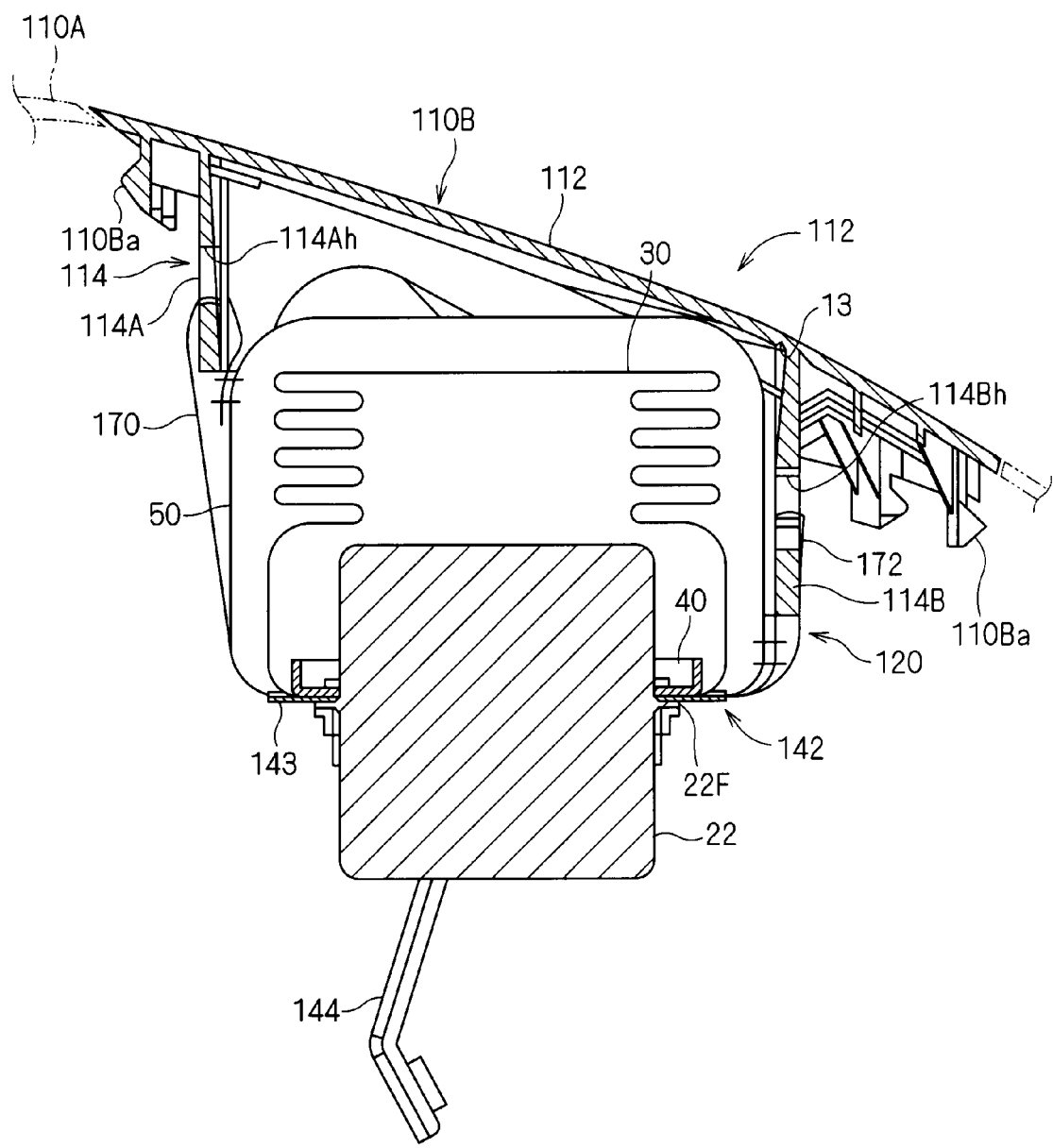
FIG. 16 is a cross-sectional view showing an airbag device according to a second embodiment.

An airbag device according to a second embodiment is described. FIG. 16 is a cross-sectional view showing an entire configuration of an airbag device 120 according to the present embodiment, and FIG. 17 is an exploded cross-sectional view showing the airbag device 120. FIG. 16 and FIG. 17 each show a cross section in a surface along a front and rear direction of a vehicle. In the description of the present embodiment, identical components to those described in the first embodiment are denoted by identical symbols and description thereof is omitted, and differences from the first embodiment are mainly described.

First, the airbag device 120 is installed into an instrument panel 110 as follows. That is, the instrument panel 110 is disposed in front of a passenger seat of a vehicle, similarly to the instrument panel 10. The instrument panel 110 includes an instrument panel main body 110A secured to the vehicle body and a lid panel portion 110B mounted to the instrument panel main body 110A. An opening (in this case, approximately square-shaped opening) is formed in the instrument panel main body 110A, and the lid panel portion 110B is interlocked with and secured to the opening. The lid panel portion 110B is secured by, for example, engaging an engaging portion 110Ba formed in the lid panel portion 110B with an engagement part (not shown) formed in the instrument panel main body 110A.

The lid panel portion 110B is formed of a resin or the like, and is used as an airbag-installation panel in which the airbag device 120 is installed. A lid portion 112 similar to the lid portion 12 is formed in the lid panel portion 110B.

A lid-side peripheral wall portion 114 that is provided to stand on an outer periphery of the lid portion 112 is formed on the inner surface of the lid panel portion 110B. The lid-side peripheral wall portion 114 surrounds the lid portion 112 over the entire outer periphery similarly to the lid-side peripheral wall portion 14. However, differently from the lid-side peripheral wall portion 14, the lid-side peripheral wall portion 114 is inclined with respect to the principal surface of the lid panel portion 110B and extends so as to be directed approximately vertically downward in the state in which the lid panel portion 110B is mounted to the instrument panel main body 110A. In this state, a lower end of a side wall portion 114A (left in FIG. 16) of the lid-side peripheral wall portion 114 on one side located in the front of the car is located above a lower end of a side wall portion 114B (right in FIG. 16) thereof on the other side located in the back of the vehicle. Further, mounting holes 114Ah and 114Bh for connecting a belt portion 170 described below are formed in the side wall portions 114A and 114B.

The airbag device 120 includes the inflator 22, the airbag 30 and the outer bag 50, and further includes belt portions 170 and 172.

FIG. 18 is a perspective view showing the outer bag 50 and the belt portions 170 and 172 in the course of assembly. As shown in FIG. 16 to FIG. 18, the belt portions 170 and 172 are members that are connected to the inflator 22 and the lid-side peripheral wall portion 114 and hold the inflator 22 at a fixed location inside of the lid portion 112. In this case, description is given of an example in which one ends of the belt portions 170 and 172 are connected to the inflator 22, and the other ends of the belt portions 170 and 172 are caused to pass through the mounting holes 114Ah and 114Bh formed in the lid-side peripheral wall portion 114 and are connected to the outer-bag-side peripheral wall portion 54.

That is, a pair of belt portions 170 are connected to the second side wall portion 54c on one side of the outer bag 50, and a pair of belt portions 172 are connected to the second side wall portion 54d on the other side thereof.

The pair of belt portions 170 are configured to be integrated together at a proximal end, separated from each other at the middle portion in the longitudinal direction through a hole portion (having a shape becoming gradually narrower from the proximal end toward the distal end in this case), and separated from each other at the distal end by, for example, cutting. The distal ends of the pair of belt portions 170 have an arc-shaped recessed edge corresponding to the outer peripheral shape of the inflator 22, and the mounting hole is formed at the location that is located on the outer periphery of the recessed edge and corresponds to the mounting hole formed around the air inlet of the airbag 30. The proximal end of the pair of belt portions 170 is connected to the outer peripheral surface of the second side wall portion 54c on one side, and extends upwardly from the second side wall portion 54c in the state before it is attached to the lid-side peripheral wall portion 114 (see FIG. 18).

The pair of belt portions 172 have approximately the identical configuration to that of the pair of belt portions 170 except for that the length dimension thereof is different from that of the pair of belt portions 170. The proximal end of the pair of belt portions 172 is connected to the outer peripheral surface of the second side wall portion 54d on the other side, and extends upwardly from the second side wall portion 54d in the state before it is attached to the lid-side peripheral wall portion 114 (see FIG. 18).

Description is now given of an example of a manufacturing method for the outer bag 50 and the pairs of belt portions 170 and 172.

First, a sheet-like member such as a fabric is appropriately cut, to thereby manufacture sheet-like members shown in FIG. 19 to FIG. 22.

Figure 19:
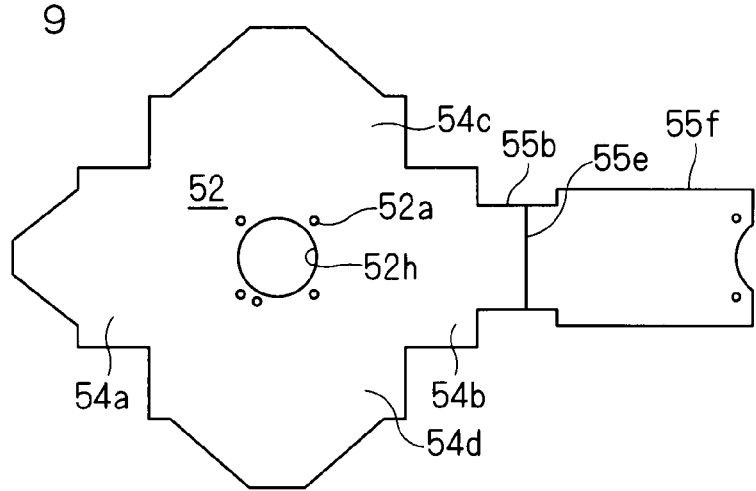
FIG. 19 is an explanatory view showing an outer bag manufacturing process.
Figure 20:
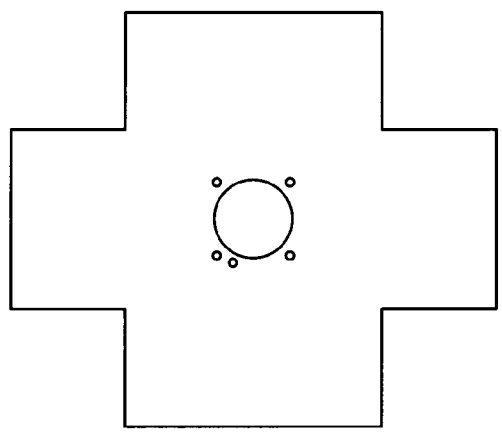
FIG. 20 is an explanatory view showing the outer bag manufacturing process.
Figure 21:
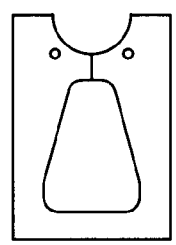
FIG. 21 is an explanatory view showing the outer bag manufacturing process.
Figure 22:
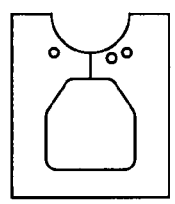
FIG. 22 is an explanatory view showing the outer bag manufacturing process.

FIG. 19 shows a sheet-like member similar to the sheet-like member shown in FIG. 14 described in the first embodiment. FIG. 20 shows a sheet-like member having an approximately cross shape that is superimposed on the member shown in FIG. 19. In this manufacturing example, description is given of an example in which the outer bag 50 has a double configuration with the sheet-like member shown in FIG. 20, but the sheet-like member is not necessarily required. In the description other than the description on the manufacturing method, the sheet-like member shown in FIG. 20 is omitted. FIG. 21 shows a sheet-like member forming the pair of belt portions 170, and FIG. 22 shows a sheet-like member forming the pair of belt portions 172, and two sheets are prepared respectively.

Figure 24:
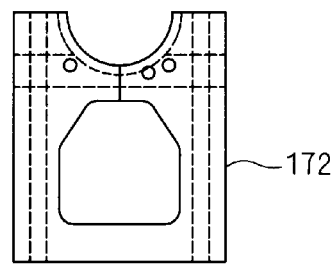
FIG. 24 is an explanatory view showing the outer bag manufacturing process.

The two sheet-like members shown in FIG. 21 are sewn together in a superimposed manner, to thereby manufacture the pair of belt portions 170 as shown in FIG. 23. The two sheet-like members shown in FIG. 22 are sewn together in a superimposed manner, to thereby manufacture the pair of belt portions 172 as shown in FIG. 24.

Figure 25:
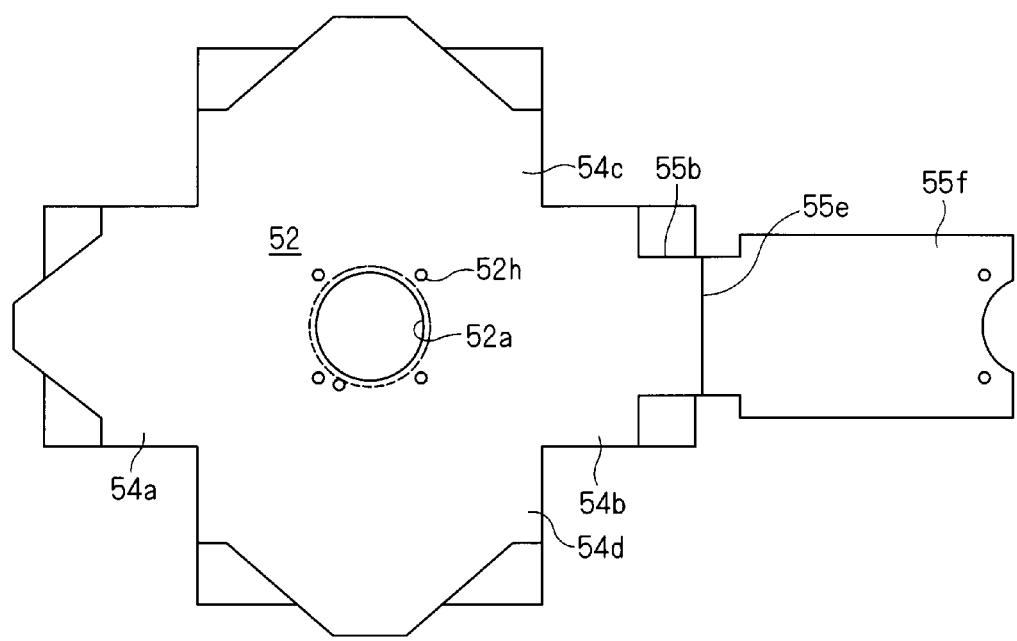
FIG. 25 is an explanatory view showing the outer bag manufacturing process.

As shown in FIG. 25, the sheet-like member shown in FIG. 19 and the sheet-like member shown in FIG. 20 are superimposed on each other.

Figure 26:
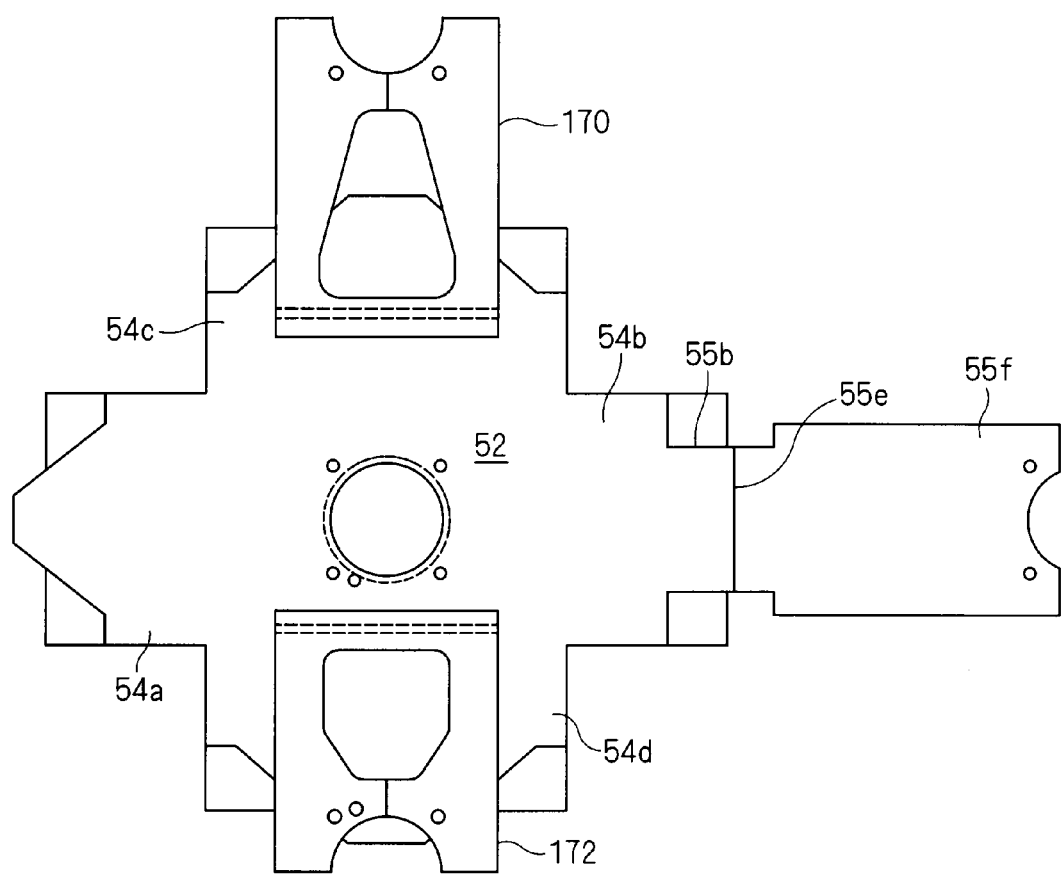
FIG. 26 is an explanatory view showing the outer bag manufacturing process.

Then, as shown in FIG. 26, the proximal ends of the pair of belt portions 170 and 172 are connected to the parts of the superimposed sheet-like members shown in FIG. 25 that are correspond to the second side wall portions 54c and 54d by sewing or the like.

Figure 27:
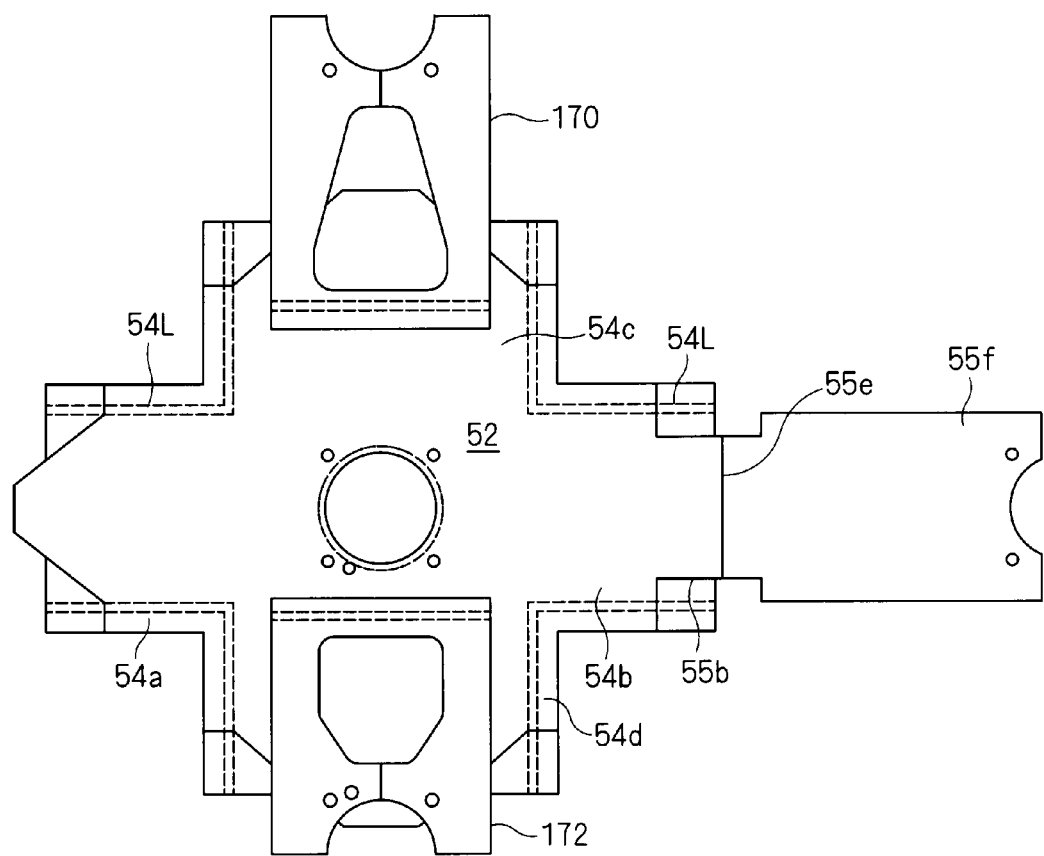
FIG. 27 is an explanatory view showing the outer bag manufacturing process.
Figure 28:
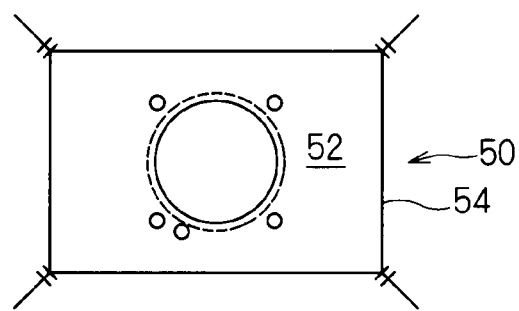
FIG. 28 is an explanatory view showing the outer bag manufacturing process.
Figure 29:
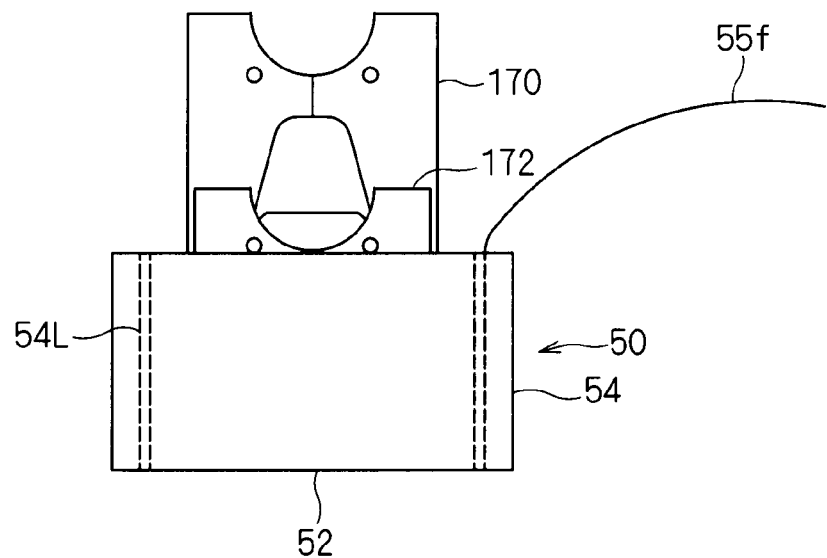
FIG. 29 is an explanatory view showing the outer bag manufacturing process.

Then, as in the first embodiment, the side edges of the first side wall portions 54a and 54b and the second side wall portions 54c and 54d are sewn together along the seams 54L shown in FIG. 27. Accordingly, the outer bag 50 is obtained, which is three-dimensionally sewn into an approximately housing shape with one side (upper side) being open.

Figure 30:
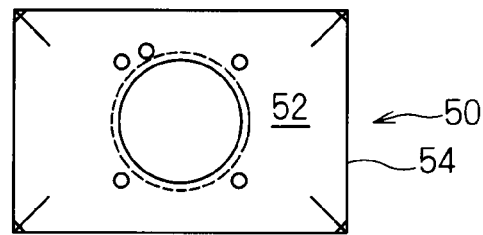
FIG. 30 is an explanatory view showing the outer bag manufacturing process.
Figure 31:
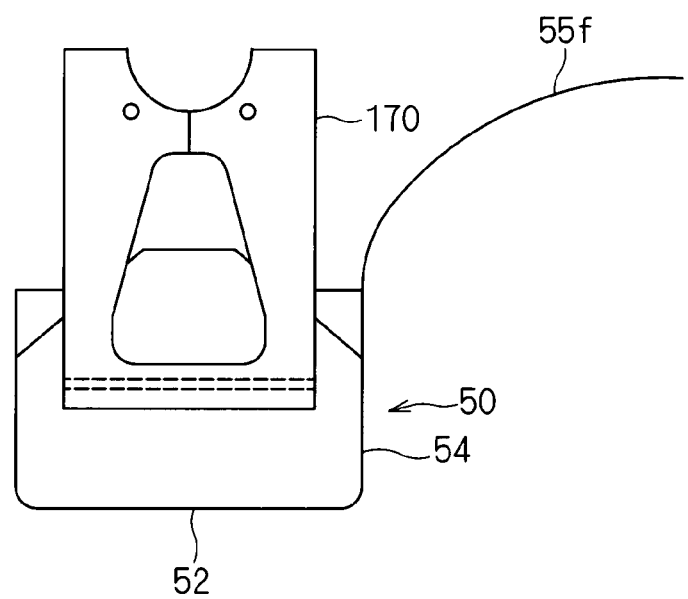
FIG. 31 is an explanatory view showing the outer bag manufacturing process.

Then, the outer bag 50 immediately after sewing is turned inside out, to thereby obtain, as shown in FIG. 30 and FIG. 31, the outer bag 50 that has an approximately housing shape with one side (upper side) being open and seams located inside, in which the pairs of belt portions 170 and 172 are sewn to the outer surfaces of the second side wall portions 54c and 54d. As in the first embodiment, the folded airbag 30 is housed in the outer bag 50 so as to be enveloped.

The structure for mounting the above-mentioned inflator 22, airbag 30, outer bag 50 and pairs of belt portions 170 and 172 is described.

First, as in the first embodiment, the inflator 22, the airbag 30 and the outer bag 50 are secured to each other with the inner ring member 40 and an inflator securing member 142.

The inflator securing member 142 includes a reaction plate 143 similar to the reaction plate 43.

Then, as in the first embodiment, the inner ring member 40 is disposed on the periphery of the inlet in the folded airbag 30, and the securing bolts 40B thereof are caused to pass through the mounting holes formed in the airbag 30, the outer bag 50, the reaction plate 143 and the inflator 22 in this order, whereby the securing nuts 40N are screwed and fastened with the securing bolts 40B. As a result, the airbag 30, the outer bag 50 and the reaction plate 143 are mounted and secured in the state of being sandwiched between the inner ring member 40 and the annular projection 22F of the inflator 22.

With reference to FIG. 16 and FIG. 17, a back-surface-side auxiliary bracket 144 is extended on the back surface side of the reaction plate 143. The back-surface-side auxiliary bracket 144 is mounted and secured to, for example, the vehicle-body-side member 18 by screwing or the like. With reference to FIG. 17, side auxiliary brackets 145 are extended on the sides of the reaction plate 143. The side auxiliary brackets 145 are mounted and secured to, for example, the lid-side peripheral wall portion 114 by screwing, fitting structure or the like.

Needless to say, those back-surface-side auxiliary bracket 144 and side auxiliary bracket 145 may be omitted, and also in a case where those are not omitted, robust securing is not required enough to withstand the force when the airbag is inflated and deployed, which may be a simple securing structure.

Needless to say, the securing structure of those components is not limited to the example described above. For example, an outer bag may be secured to a reaction plate or the like and secured indirectly to the inflator 22 through the reaction plate or the like.

Description is given of the configuration for mounting an integrated structure of the inflator 22, the airbag 30 and the outer bag 50 to the lid panel portion 110B.

First, the folded airbag 30 and the outer bag 50 that envelopes this are pushed inside the lid-side peripheral wall portion 114 while causing the pair of belt portions 170 and the pair of belt portions 172 to pass through the mounting holes 114Ah and 114Bh of the side wall portions 114A and 114B of the lid-side peripheral wall portion 114, respectively, from the inside.

After that, the pair of belt portions 170 and the pair of belt portions 172 are folded back toward the inflator 22 from the outer surface of the lid-side peripheral wall portion 114 along the back surface side of the reaction plate 143. Then, the securing bolts 40B of the inner ring member 40, which project toward the back surface side of the annular projection 22F of the inflator 22, are caused to pass through the mounting holes on the distal end side of the pair of belt portions 170 and the pair of belt portions 172. Then, the securing nuts 40N are screwed and fastened with the securing bolts 40B. Before entering this state, the securing nuts 40N may be loosely fastened with the securing bolts 40B such that the securing nuts 40 are detached as required. This allows the inflator 22 to be held at a location with a predetermined spacing from the lid portion 112. From another viewpoint, the pair of belts 170 and 172 serve to suppress the airbag 30 from going up toward the direction of becoming apart from the inflator 22 when the airbag 30 is inflated and deployed.

Then, as described above, the lid panel portion 110B to which the inflator 22, the airbag 30 and the outer bag 50 are mounted is fitted with the opening of the instrument panel main body 110A from the outside thereof, whereby the airbag device 120 is installed into the instrument panel 110. On this occasion, the robust securing structure of the airbag device 120 and the vehicle-body-side member 18 is not required, which enables to install the airbag device 120 relatively with ease.

Figure 32:
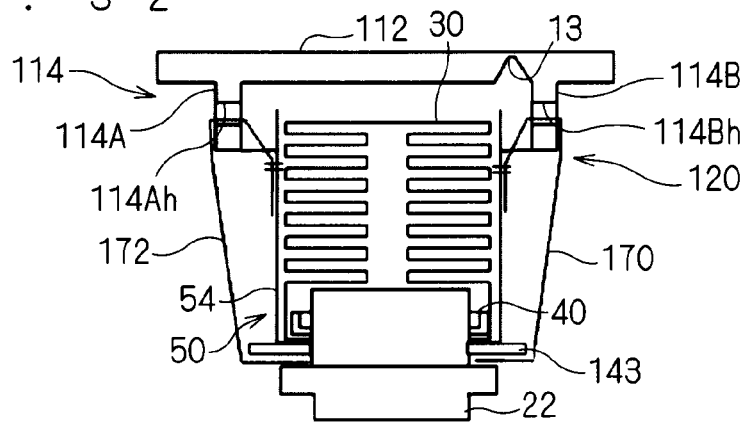
FIG. 32 is an explanatory view showing an operation of deploying the airbag device.
Figure 33:
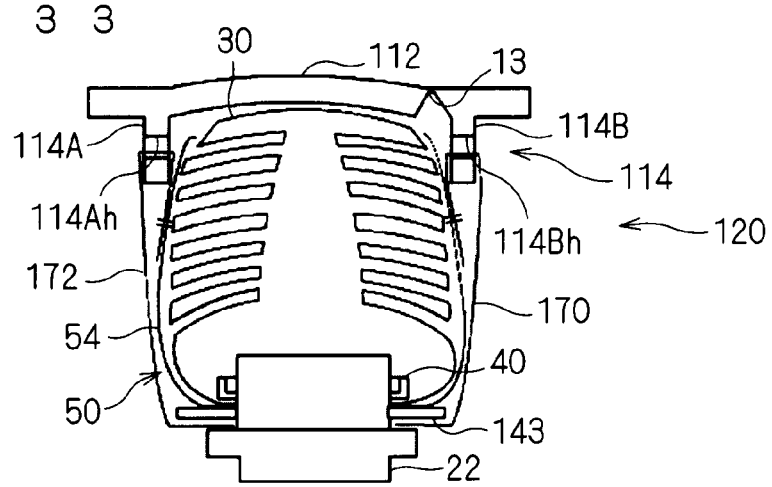
FIG. 33 is an explanatory view showing the operation of deploying the airbag device.
Figure 34:
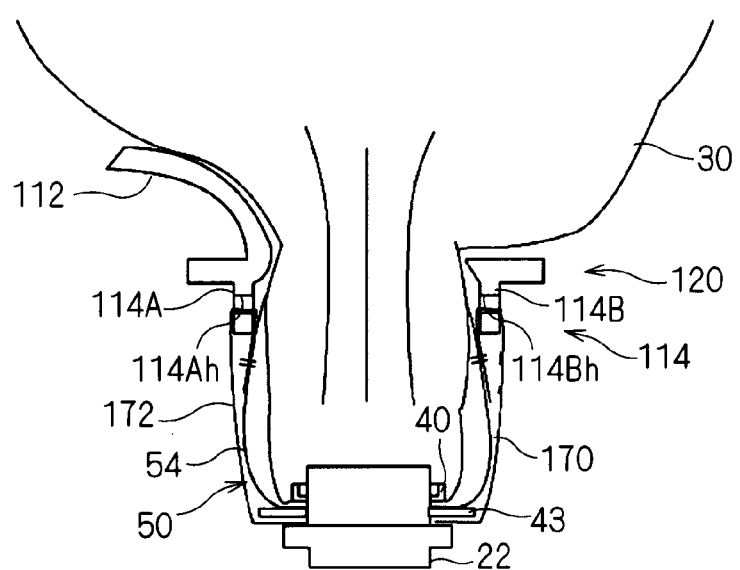
FIG. 34 is an explanatory view showing the operation of deploying the airbag device.

FIG. 32 to FIG. 34 are explanatory views showing an operation of deploying the airbag device 120. Those figures are simplified such that, for example, the side wall portion 114A and the side wall portion 114B of the lid-side peripheral wall portion 114 are shown to be approximately flush with each other and the first extending portions 55a and 55b and the second extending portions 55c and 55d of the outer bag 50 are omitted, for the sake of description.

First, as shown in FIG. 32, the folded airbag 30 is disposed between the lid portion 112 and the inflator 22 in the normal state before the deploying operation. In this state, the lid-side peripheral wall portion 114 surrounds the upper end portion of the folded airbag 30 from surrounding four sides. The first side wall portions 54a and 54b and the second side wall portions 54c and 54d of the outer bag 50 surround the folded airbag 30 from the surrounding four sides.

In this state, the gas from the inflator 22 is introduced into the airbag 30, and then, as shown in FIG. 33, the airbag 30 starts to be inflated in the space surrounded by the lie portion 112, the lid-side peripheral wall portion 114 and the inflator 22.

On this occasion, the inflator 22 is held at a location with a predetermined spacing from the lid portion 112 by the belt portions 170 and 172 in the direction in which the airbag 30 mainly projects (direction from the inflator 22 toward the lid portion 112), and thus the force for inflating and deploying the airbag 30 in the mainly projecting direction acts as the force for tearing the lid portion 112.

On this occasion, as in the first embodiment, the airbag 30 tries to be inflated and deployed also in the radial direction around the mainly projecting direction (direction from the inflator 22 toward the lid portion 112) being the center. Then, as in the first embodiment, in the part in which the lid-side peripheral wall portion 114 is present, the airbag 30 that tries to be inflated and deployed is pressed against the inner surface of the lid-side peripheral wall portion 114, and accordingly the outer-bag-side peripheral wall portion 54 is held so as to be sandwiched between the airbag 30 and the lid-side peripheral wall portion 114. The part of the outer-bag-side peripheral wall portion 54 that is interposed between the lid-side peripheral wall portion 114 and the inflator 22 braces the part of the airbag 30 that tries to be inflated and deployed, which is in the vicinity of the inflator 22. This enables to suppress the airbag 30 from being inflated and deployed outwardly in a manner of spreading in the radial direction between the lid-side peripheral wall portion 114 and the inflator 22.

Then, the lid portion 112 is torn, and accordingly, the airbag 30 is inflated and deployed outwardly after passing through the opening of the instrument panel 110 as shown in FIG. 34. Also in this state, with the configuration in which the outer-bag-side peripheral wall portion 54 is sandwiched between the airbag 30 and the lid-side peripheral wall portion 114, the state in which the outer-bag-side peripheral wall portion 54 partially overlaps the lid-side peripheral wall portion 114 is maintained. Accordingly, as described in the above, the part of the outer-bag-side peripheral wall portion 54, which is interposed between the lid-side peripheral wall portion 114 and the inflator 22, braces the part of the airbag 30 that is inflated and deployed which is in the vicinity of the inflator 22 over the entire periphery. This suppresses the airbag 30 from spreading in the radial direction between the lid-side peripheral wall portion 114 and the inflator 22.

Then, the airbag 30 is inflated and deployed between the instrument panel 110 and the passenger-seat occupant, and accordingly braces the passenger-seat occupant and absorbs an impact.

According to the airbag device 120 configured as described above, it is possible to obtain the operation and effect of reducing a weight as much as possible while suppressing the airbag 30 from spreading in the radial direction between the lid-side peripheral wall portion 114 and the inflator 22, as in the first embodiment.

Further, the inflator 22 is held at a fixed location inside of the lid portion 112 mainly by the belt portions 170 and 172, which further reduces a weight of the configuration for holding the inflator 22.

Moreover, the proximal ends of the belt portions 170 and 172 are connected to the second side wall portions 54c and 54d after passing through the mounting holes 114Ah and 114Bh, which makes it difficult for the outer-bag-side peripheral wall portion 54 to come off the part between the airbag 30 being inflated and deployed and the lid-side peripheral wall portion 114. This allows the outer-bag-side peripheral wall portion 54 to be kept between the lid-side peripheral wall portion 114 and the inflator 22 with more reliability, and the airbag 30 can be suppressed from spreading in the radial direction in that part with more reliability.

The inflator 22 is secured to a fixed location inside of the lid portion 112 by the belt portions 170 and 172, which enables to simplify or omit the structure for securing the inflator 22 and the vehicle-body-side member. As a result, it suffices that for example, the lid panel portion 110B to which the inflator 22, the airbag 30 and the like are mounted is mounted to the instrument panel main body 110A, which simplifies the operation of installing the airbag device 120 in the instrument panel 110.

The belt portions 170 and 172 mainly serve to keep the location of the inflator 22 fixed with respect to the lid portion 112. For this reason, it suffices that the belt portions 170 and 172 are intermittently located at least in two spots (in this case, four spots around the airbag 30) around the outer periphery of the airbag 30 without being located successively over the entire outer periphery of the airbag 30.

Alternatively, the belt portions 170 and 172 are not necessarily required to be directly connected to the inflator 22, and may be connected to the reaction plate 143 by screwing or the like and connected indirectly to the inflator 22 through the reaction plate 143.

Alternatively, the configuration for connecting the belt portions to the lid-side peripheral wall portion is not limited to the example described above.

Figure 35:
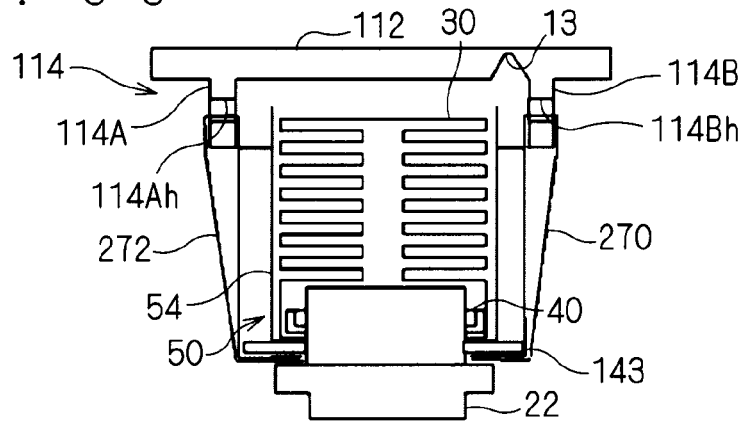
FIG. 35 is an explanatory view showing an operation of deploying an airbag device according to a modification of the second embodiment.

For example, the configuration may be made such that as shown in FIG. 35, the middle portions of belt portions 270 and 272 in the longitudinal direction are caused to pass through the mounting holes 114Ah and 114Bh formed in the side wall portions 114A and 114B of the lid-side peripheral wall portion 114 and the both ends of the belt portions 270 and 272 are connected to the inflator 22.

Figure 36:
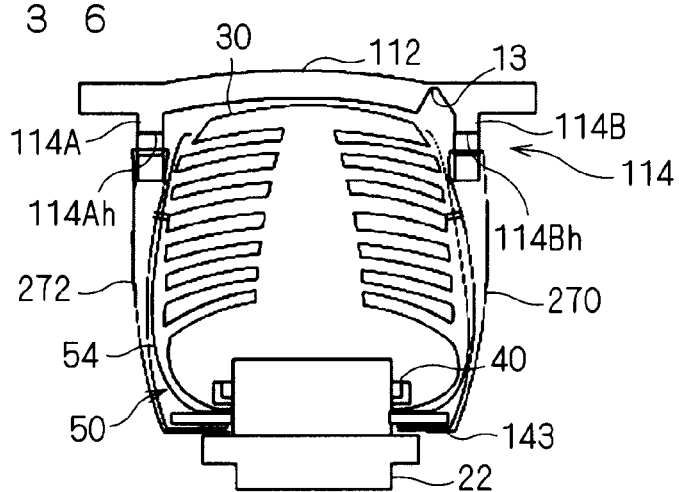
FIG. 36 is an explanatory view showing the operation of deploying the airbag device according to the modification of the second embodiment.
Figure 37:
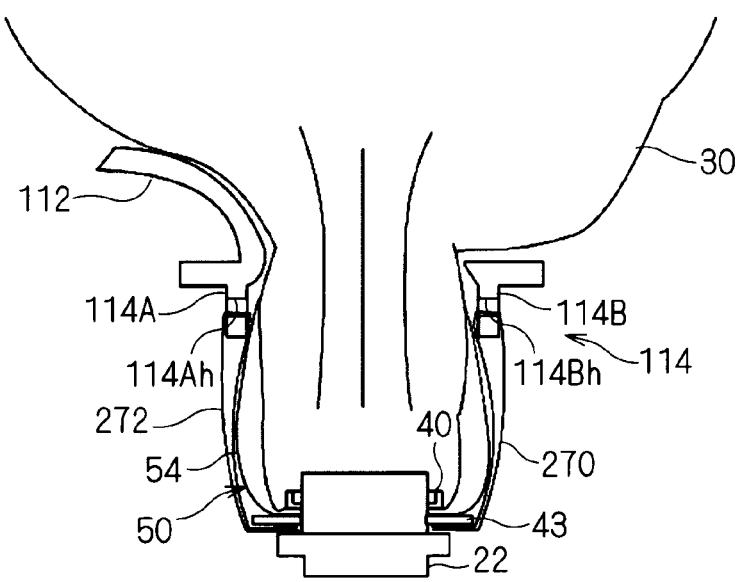
FIG. 37 is an explanatory view showing the operation of deploying the airbag device according to the modification of the second embodiment.

Also in this case, as shown in FIG. 36 and FIG. 37, the belt portions 270 and 272 hold the inflator 22 at a fixed location with respect to the lid portion 112 when the airbag 30 is inflated and deployed, as in the above-mentioned case. Therefore, it is possible to obtain the operation and effect of reducing a weight as much as possible while suppressing the airbag 30 from spreading in the radial direction between the lid-side peripheral wall portion 114 and the inflator 22, as in the above-mentioned case.

It suffices that both ends of the belt portions 270 and 272 are connected to the inflator 22, and accordingly an operation of connecting those to the outer bag by, for example, sewing is not required, which simplifies the connection structure thereof.

Figure 38:
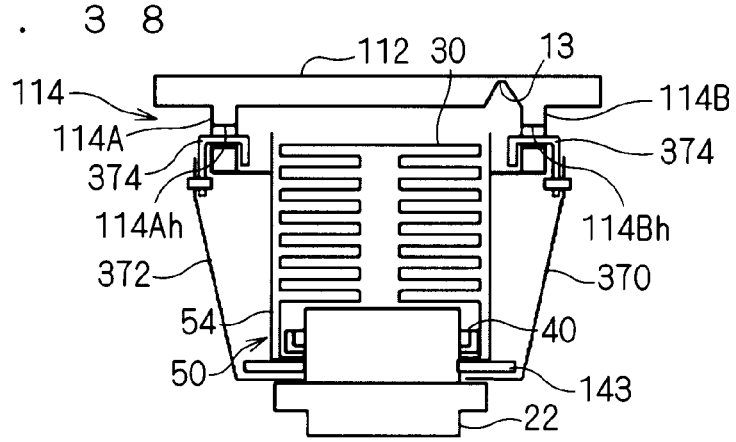
FIG. 38 is an explanatory view showing an operation of deploying an airbag device according to another modification of the second embodiment.

For example, as shown in FIG. 38, proximal ends of belt portions 370 and 372 may be connected to the inflator 22, and the other ends of the belt portions 370 and 372 may be engaged with and secured to the mounting holes 114Ah and 114Bh formed in the side wall portions 114A and 114B through hook portions 374. A member obtained by bending, for example, a metal sheet material approximately in a U-shape may be used as the hook portion 374. Sewing, sandwiching structure by caulking or the like, and a configuration with other clip member or the like may be used as the structure of connecting the other ends of the belt portions 370 and 372 to the hook portion 374. Here, the hook portions 374 are interlocked with the mounting holes 114Ah and 114Bh from the outer surfaces of the side wall portions 114A and 114B.

Figure 39:
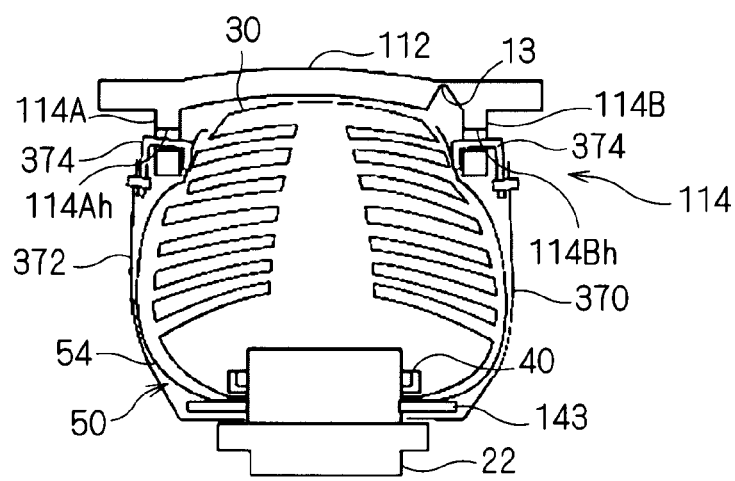
FIG. 39 is an explanatory view showing the operation of deploying the airbag device according to the another modification of the second embodiment.
Figure 40:
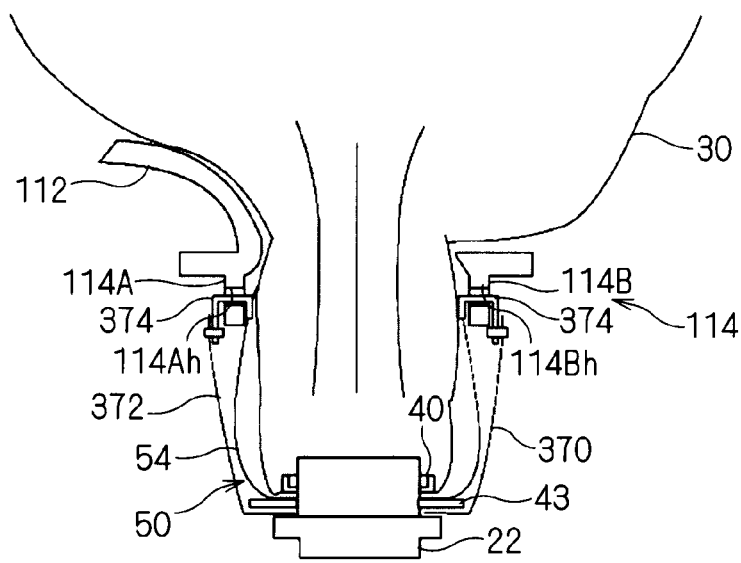
FIG. 40 is an explanatory view showing the operation of deploying the airbag device according to the another modification of the second embodiment.

Also in this modification, as shown in FIG. 39 and FIG. 40, the belt portions 370 and 372 hold the inflator 22 at a fixed location with respect to the lid portion 112 when the airbag 30 is inflated and deployed similarly in the case described above. Therefore, as in the case described above, it is possible to obtain the operation and effect of reducing a weight as much as possible while suppressing the airbag 30 from spreading in the radial direction between the lid-side peripheral wall portion 114 and the inflator 22.

The hook portions 374 at the both ends of the belt portions 370 and 372 can be interlocked with and connected to the inflator 22 relatively with ease in a manner of being hooked to the mounting holes 114Ah and 114Bh formed in the side wall portions 114A and 114B.

For example, if a belt length adjusting mechanism is installed into the belt portions 370 and 372, the hook portions 374 can be easily hooked to the mounting holes 114Ah and 114Bh in the state in which the belt portions 370 and 372 are relatively long, and then, the inflator 22 can be held at a fixed location by reducing the lengths of the belt portions 370 and 372.

The airbag 30 and the lid-side peripheral wall portion 114 are inflated outwardly when the airbag 30 is inflated, whereby the belt portions 370 and 372 are inflated so as to be curved outwardly. As a result, the pivotal ends of the hook portions 374 interlocked outwardly with the mounting holes 114Ah and 114Bh are displaced outwardly, and the distal ends of the hook portions 374 are firmly jammed into the inner surface of the lid-side peripheral wall portion 114 on the peripheries of the mounting holes 114Ah and 114Bh. This prevents the hook portions 374 from being detached more reliably.

<Common Modifications>

{Modifications}

The configuration for supporting an inflator is not limited to the examples described in the first embodiment and the second embodiment, and various configurations may be adopted. For example, a configuration may be such that the inflator securing member according to the first embodiment and the belt member according to the second embodiment are used in combination. That is, the configuration is only required that an inflator be supported at a fixed location with respect to a lid portion and that an outer bag be disposed so as to be sandwiched between an airbag being inflated and deployed and a lid-side peripheral wall portion when the airbag is inflated and deployed.

While the examples in which an airbag device is installed into an instrument panel for passenger seats have been described in the embodiments above, applicable targets are not limited to those. For example, the airbag device is applicable to various airbags that are installed into any mounting panels for driver seats, side airbags or the like and are inflated by tearing a lid.

The respective configurations described in the embodiments and modifications can be appropriately combined as long as they are not inconsistent with each other.

While the airbag device has been shown and described in detail, the foregoing description is in all aspects illustrative, and the present invention is not limited thereto. That is, numerous modifications and variations can be devised in the described aspects without departing from the scope of the invention.

The invention claimed is:

1. An airbag device installed into an airbag-installation panel including a lid portion configured to be torn and a lid-side peripheral wall portion provided to stand on an outer periphery of said lid portion, said airbag device comprising:
   an inflator disposed inside said lid portion with spacing from an outer periphery at a distal end of said lid-side peripheral wall portion and configured to generate gas;
   an airbag folded so as to be disposed between said lid portion and said inflator and configured to be inflated and deployed in a bag shape by the gas introduced from said inflator; and
   an outer bag formed of a sheet-like member to be sewn into a three-dimensional shape including an outer-bag-side bottom and an outer-bag-side peripheral wall portion provided on an outer periphery of said outer-bag-side bottom, said outer-bag-side bottom being secured to said inflator, said outer-bag-side peripheral wall portion surrounding said folded airbag, and while said airbag is being inflated and deployed, a part of said outer-bag-side peripheral wall portion is disposed so as to be sandwiched between said airbag being inflated and deployed and said lid-side peripheral wall portion, and a part of said outer-bag-side peripheral wall portion that is interposed between the outer periphery at the distal end of said outer-bag-side peripheral wall portion and said inflator is disposed so as to brace said airbag during inflation and deployment of said airbag in a radial direction.

2. The airbag device according to claim 1, wherein said outer bag includes an approximately box shape formed by four side walls of said outer-bag-side peripheral wall portion, and an extending portion is disposed at a distal end of each of said four side walls.

3. The airbag device according to claim 1, further comprising a belt portion, so that said inflator is secured to said lid-side peripheral wall portion only by a configuration using the belt portion.

4. An airbag device installed into an airbag-installation panel including a lid portion configured to be torn and a lid-side peripheral wall portion provided to stand on an outer periphery of said lid portion, said airbag device comprising:
   an inflator disposed inside said lid portion and configured to generate gas;
   an airbag folded so as to be disposed between said lid portion and said inflator and configured to be inflated and deployed in a bag shape by the gas introduced from said inflator;
   an outer bag formed of a sheet-like member to be sewn into a three-dimensional shape including an outer-bag-side bottom and an outer-bag-side peripheral wall portion provided on an outer periphery of said outer-bag-side bottom, said outer-bag-side bottom being secured to said inflator, said outer-bag-side peripheral wall portion surrounding said folded airbag and being disposed so as to be sandwiched between said airbag being inflated and deployed and said lid-side peripheral wall portion; and
   a belt portion connected to said inflator and said lid-side peripheral wall portion and holding said inflator at a fixed location inside of said lid portion,
   wherein one end of said belt portion is connected to said inflator, and the other end of said belt portion is caused to pass through a mounting hole formed in said lid-side peripheral wall portion to be connected to said outer-bag-side peripheral wall portion.

5. An airbag device installed into an airbag-installation panel including a lid portion configured to be torn and a lid-side peripheral wall portion provided to stand on an outer periphery of said lid portion, said airbag device comprising:

an inflator disposed inside said lid portion and configured to generate gas;

an airbag folded so as to be disposed between said lid portion and said inflator and configured to be inflated and deployed in a bag shape by the gas introduced from said inflator;

an outer bag formed of a sheet-like member to be sewn into a three-dimensional shape including an outer-bag-side bottom and an outer-bag-side peripheral wall portion provided on an outer periphery of said outer-bag-side bottom, said outer-bag-side bottom being secured to said inflator, said outer-bag-side peripheral wall portion surrounding said folded airbag and being disposed so as to be sandwiched between said airbag being inflated and deployed and said lid-side peripheral wall portion; and a belt portion connected to said inflator and said lid-side peripheral wall portion and holding said inflator at a fixed location inside of said lid portion, wherein a middle portion of said belt portion in a longitudinal direction is caused to pass through a mounting hole formed in said lid-side peripheral wall portion, and both ends of said belt portion are connected to said inflator.

* * * * *